(12) United States Patent
Ninomiya

(10) Patent No.: US 8,880,848 B2
(45) Date of Patent: Nov. 4, 2014

(54) MEMORY CONTROL AND DATA PROCESSING USING MEMORY ADDRESS GENERATION BASED ON DIFFERENTIAL ADDRESSES

(75) Inventor: Yasuyuki Ninomiya, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 165 days.

(21) Appl. No.: 13/619,448

(22) Filed: Sep. 14, 2012

(65) Prior Publication Data

US 2013/0097393 A1    Apr. 18, 2013

(30) Foreign Application Priority Data

Oct. 18, 2011    (JP) ................................. 2011-228952

(51) Int. Cl.
*G06F 12/02* (2006.01)
*G06F 13/28* (2006.01)

(52) U.S. Cl.
CPC ............ *G06F 13/28* (2013.01); *G06F 12/0292* (2013.01); *G06F 12/0223* (2013.01)
USPC ..................... 711/217; 711/220; 711/E12.096

(58) Field of Classification Search
CPC ......................... G06F 12/0292; G06F 12/0223
USPC .................................. 711/217, 220, E12.096
See application file for complete search history.

(56) References Cited

U.S. PATENT DOCUMENTS

| 6,601,158 | B1 * | 7/2003 | Abbott et al. | ................. 711/220 |
| 7,313,645 | B2 | 12/2007 | Hasegawa | |
| 2002/0053015 | A1 * | 5/2002 | Tan et al. | .......................... 712/42 |
| 2004/0003185 | A1 * | 1/2004 | Efland et al. | ................... 711/150 |
| 2007/0083729 | A1 * | 4/2007 | Moat et al. | ..................... 711/217 |
| 2008/0133877 | A1 * | 6/2008 | Chai et al. | ....................... 711/218 |
| 2009/0013151 | A1 * | 1/2009 | Hara | ............................... 712/22 |
| 2009/0217009 | A1 * | 8/2009 | Shum et al. | .................... 712/226 |
| 2010/0303090 | A1 | 12/2010 | Inoue et al. | |
| 2010/0325387 | A1 * | 12/2010 | Yamane et al. | ................. 712/29 |

FOREIGN PATENT DOCUMENTS

| JP | 2005-309499 A | 11/2005 |
| JP | 2010-170164 A | 8/2010 |
| JP | 2010-277429 A | 12/2010 |

* cited by examiner

*Primary Examiner* — Hal Schnee
(74) *Attorney, Agent, or Firm* — McDermott Will & Emery LLP

(57) ABSTRACT

A memory control device that transfers data from an external memory to a data processing unit having plural processing mechanisms, includes an absolute address storage unit that stores an absolute address serving as a common reference value in a given data transfer period; a differential address storage unit that stores plural differential addresses therein; a differential address selection unit that selects any one of the plurality of differential addresses in a given order; a memory address generation unit that combines any differential address selected by the differential address selection unit with the absolute address to generate a memory address; and a data transfer unit that inputs the memory address generated by the memory address generation unit to the external memory, reads the data from the memory address, and transfers the data to the data processing unit.

14 Claims, 22 Drawing Sheets

IMAGE DATA ON EXTERNAL MEMORY

MEMORY CONTROL AND DATA PROCESSING USING MEMORY ADDRESS GENERATION BASED ON DIFFERENTIAL ADDRESSES

CROSS-REFERENCE TO RELATED APPLICATIONS

The disclosure of Japanese Patent Application No. 2011-228952 filed on Oct. 18, 2011 including the specification, drawings and abstract is incorporated herein by reference in its entirety.

BACKGROUND

The present invention relates to a memory control technology and a data processing technology, and more particularly to a DMA (direct memory access) control technology and a data processing technology for an SIMD (single instruction multiple data) processor.

For the purpose of increasing a data processing speed, a semiconductor integrated circuit having a plurality of arithmetic processing mechanisms starts to be used. Japanese Unexamined Patent Application Publication No. 2010-277429 discloses an SIMD processor in which a plurality of processing elements, which are processing modules, are connected by a one-way ring bus which is an annular communication channel.

Each of the processing elements configuring the SIMD processor has an internal memory, and data stored in an external memory transferred to the internal memory under a data transfer control by a DMA (direct memory access) device. The DMA device includes an address generator circuit, and generates read addresses while incrementing the addresses one by one, and data is read in the order of the addresses of the external memory, and then stored in the internal memory. The DMA device conducts column transfer for supplying data of one unit to all of the processing elements by a predesignated number of columns, and stores two-dimensional data in the internal memory. The processing elements execute given arithmetic processing on the data stored in the internal memory under a control from a control processor connected to the ring bus.

In order to conduct matrix arithmetic processing necessary for image data processing by the aid of the SIMD processor, there is a need to conduct data marshaling prior to the processing. This makes it necessary that after data has been transferred to the internal memory of each processing element from the external memory, the data is transferred to another processing element by execution of a data marshaling instruction to conduct data realignment.

However, because there is a need to transfer a large number of data among the respective processing elements at the time of initially aligning the data, a delay occurs due to data transfer among the processing elements. The delay is problematic in an improvement of the performance by parallelizing computing.

Under the circumstances, there has been proposed a technique by which the data alignment is changed when data is read into the processing elements from the external memory. For example, Japanese Unexamined Patent Application Publication No. 2005-309499 discloses a technique by which data is marshaled by supplying read addresses to a plurality of memory banks, individually, to take data from the memory banks. Also, Japanese Unexamined Patent Application Publication No. 2010-170164 discloses a technique by which data read from the external memory is temporarily stored in a buffer, and data sequence is realigned by values in a plurality of tables.

SUMMARY

In the SIMD processor of Japanese Unexamined Patent Application Publication No. 2005-309499, because data can be supplied to a computing unit with a control of the data alignment, a high processing speed can be realized with no need to execute the data marshaling instruction prior to an arithmetic instruction. However, in the data marshaling method of Japanese Unexamined Patent Application Publication No. 2005-309499, because there is a need to supply the read addresses to the plurality of memory banks, individually, those memory banks must be divided. This leads to such a problem that an area scale of the circuit is expanded by an increase in peripheral circuits such as an address decoder.

Also, in the data marshaling method of Japanese Unexamined Patent Application Publication No. 2010-170164, data to be realigned is only data temporarily stored in the buffer, resulting in such a problem that a range of data to be realigned is restricted.

Thus, in the related-art data marshaling method, data cannot be transferred to each internal memory from the external memory in a state where the data marshaling has been completed while the circuit scale is suppressed.

According to a first aspect of the present invention, there is provided a memory control device that transfers data from an external memory to a data processing unit having a plurality of processing mechanisms, the memory control device including: an absolute address storage unit that stores an absolute address serving as a common reference value in a given data transfer period; a differential address storage unit that stores a plurality of differential addresses therein; a differential address selection unit that selects any one of the plurality of differential addresses in a given order; a memory address generation unit that combines any differential address selected by the differential address selection unit with the absolute address to generate a memory address; and a data transfer unit that inputs the memory address generated by the memory address generation unit to the external memory, reads the data from the memory address, and transfers the data to the data processing unit. According to the above configuration, the memory addresses are sequentially generated with the combination of the absolute address with the differential addresses to read the data, with the result that data transfer can be conducted in a state where data marshaling is completed.

Also, according to a second aspect of the present invention, there is provided a memory control method that transfers data from an external memory to a data processing unit having a plurality of processing mechanisms, the memory control method including: storing an absolute address serving as a common reference value in a given data transfer period; storing a plurality of differential addresses therein; selecting any one of the plurality of differential addresses in a given order; combining the selected differential address with the absolute address to generate a memory address; and inputting the generated memory address to the external memory, reading the data from the memory address, and transferring the data to the data processing unit. According to the above configuration, the memory addresses are sequentially generated with the combination of the absolute address with the differential addresses to read the data, with the result that data transfer can be conducted in a state where data marshaling is completed.

Further, according to a third aspect of the present invention, there is provided a data processing unit, including: a data processing unit in which a plurality of processing mechanisms each having at least an internal memory and an arithmetic circuit are connected in series; a control unit that controls the data processing unit; an absolute address storage unit that stores an absolute address serving as a common reference value in a given data transfer period; a differential address storage unit that stores a plurality of differential addresses therein; a differential address selection unit that selects any one of the plurality of differential addresses in a given order; a memory address generation unit that combines any differential address selected by the differential address selection unit with the absolute address to generate a memory address; and a data transfer unit that inputs the memory address generated by the memory address generation unit to the external memory, reads the data from the memory address, and transfers the data to the data processing unit. According to the above configuration, the memory addresses are sequentially generated with the combination of the absolute address with the differential addresses to read the data, so that data transfer can be conducted in a state where data marshaling is completed. As a result, the data can be processed without execution of the data marshaling instruction in the data processing unit.

Further, according to a fourth aspect of the present invention, there is provided an image processing system, including: an external memory that temporarily stores data therein; an image pickup device that picks up an image and stores the image in the external memory; a data processing device that reads image data temporarily stored in the external memory to conduct given data processing according to the third aspect of the present invention; and an image display device that displays the image data that has been subjected to the given data processing by the data processing device. According to the above configuration, the image data picked up by the image pickup device such as a camera and stored in the external memory without any change is subjected to given processing such as recognition processing or matching processing at a high speed, and the image data can be displayed by the image display device such as a display. As a result, a response to a user can be quickened.

Also, according to a fifth aspect of the present invention, there is a semiconductor integrated circuit, including: a first register that stores an absolute address serving as a common reference value in a given data transfer period therein; a second register that stores a plurality of differential addresses therein; a pointer register that designates the plurality of differential addresses in a given order; a memory address generator circuit that combines any differential address selected by the pointer register with the absolute address to generate a memory address; and a data transfer circuit that inputs the memory address generated by the memory address generator circuit to a memory, and reads and transfers the data from the memory address. According to the above configuration, the memory addresses are sequentially generated with the combination of the absolute address with the differential addresses to read the data, so that data transfer can be conducted in a state where data marshaling is completed.

According to the configuration of the present invention, the data can be transferred from the external memory to the internal memory in the state where the data marshaling is completed while the circuit scale is suppressed with the result that the high processing speed can be realized.

DETAILED DESCRIPTION

Figure 1:
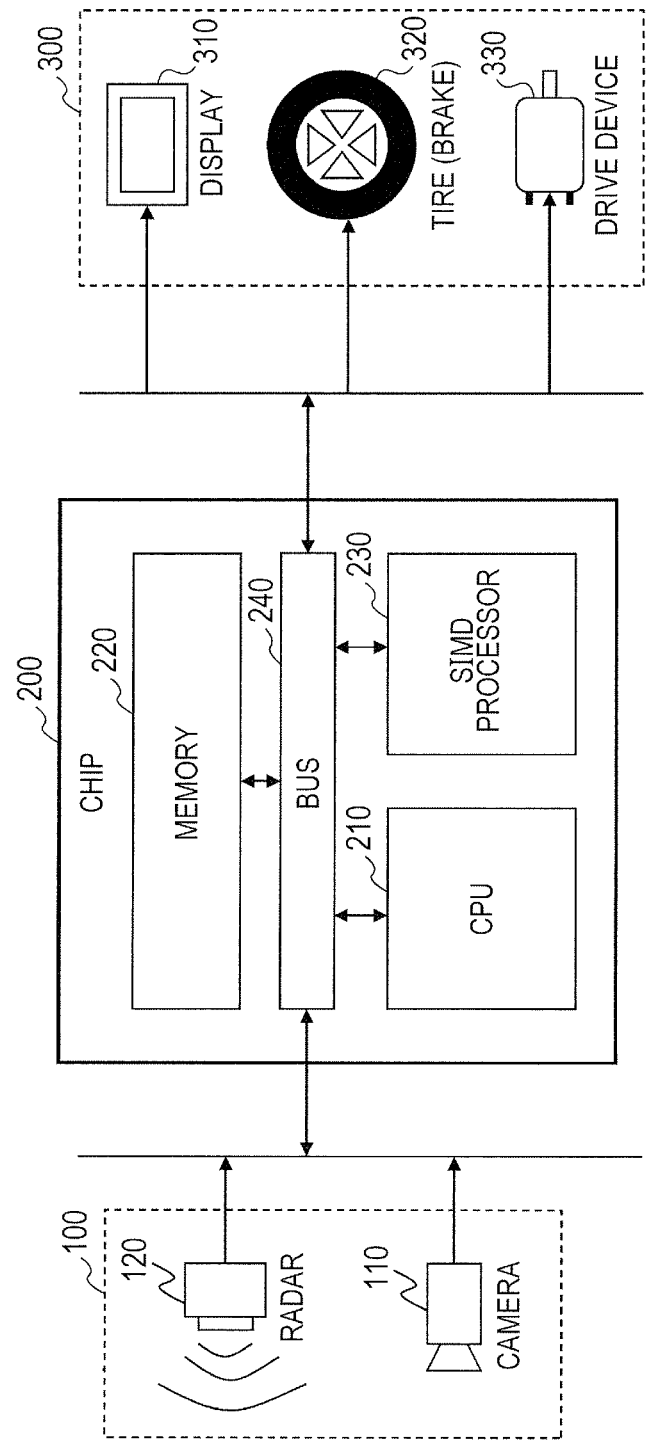
FIG. 1 is a diagram illustrating a configuration of a data processing system according to a first embodiment.

A description will be given of embodiments of the present invention below with reference to the accompanying drawings. The following description shows preferred embodiments of the present invention, and a scope of the present invention is not limited to the following embodiment. In the respective drawings, the same reference numerals or symbols denote substantially identical contents, and repetitive description will be omitted as the occasion demands.

First Embodiment

Hereinafter, a first embodiment will be described with reference to the drawings. FIG. 1 is a diagram illustrating an overall configuration of a data processing system according to the present invention. The data processing system includes an input system device group 100, a data processing device 200, and an output system device group 300.

The input system device group 100 is configured to input acquired data to the data processing device 200, and includes, for example, a camera (image pickup device) 110, and a radar 120. The camera 110 photographs an image, and inputs acquired image data to the data processing device 200. Also, the radar 120 detects a reflected radio wave, and inputs acquired received data to the data processing device 200.

The data processing device 200 conducts given data processing on the data input from the input system device group 100, and outputs the processed data to the downstream output system device group 300. The data processing device 200 includes a CPU (central processing unit) 210, a memory 220, and an SIMD processor 230, and those respective blocks are connected to each other through a bus 240. The above respective constituent elements of the data processing device 200 can be mounted on a semiconductor circuit of one chip. The CPU 210 entirely controls the data processing device 200. The memory 220 temporarily stores the data input from the input system device group 100 under a control of the CPU 210. The SIMD processor 230 reads the data stored in the memory 220, and conducts given arithmetic and work processing on the data under the control of the CPU 210. As specific examples of the arithmetic and work processing conducted by the data processing device 200, there are recognition processing for recognizing whether data related to person is included in the input image data, or not, and detection processing for detecting obstacles or white lines of a road.

The output system device group 300 outputs the data input through the bus 240 from the data processing device 200 to an external. The output system device group 300 includes, for example, a display (image display device) 310, a brake 320, a drive device 330, an actuator, and so on. The display 310 displays the processed image data output from the data processing device 200. The brake 320 operates a brake on the basis of speed adjustment control data calculated by the data processing device 200. The drive device 330 is a motor or an engine, and adjusts a supply voltage or a slot valve on the basis of the speed adjustment control data calculated by the data processing device 200 to control a rotating speed.

In the following description, it is assumed that the input system device group 100 is specifically the camera 110, and the output system device group 300 is specifically the display 310. That is, in the description, it is assumed that the data processing system is an image processing system.

Subsequently, a specific configuration of the data processing device 200 will be described in detail. The image data acquired by the camera 110 is stored in the memory 220 under the control of the CPU 210. The SIMD processor 230 reads the image data stored in the memory 220 without any change through a read method which will be described later. The SIMD processor 230 then conducts the given arithmetic and work processing on the image data by an internal arithmetic mechanism, and again stores the processed image data in the memory 220. The arithmetically processed image data stored in the memory 220 is output to the display 310 through the bus 240 under the control of the CPU 210.

Figure 2:
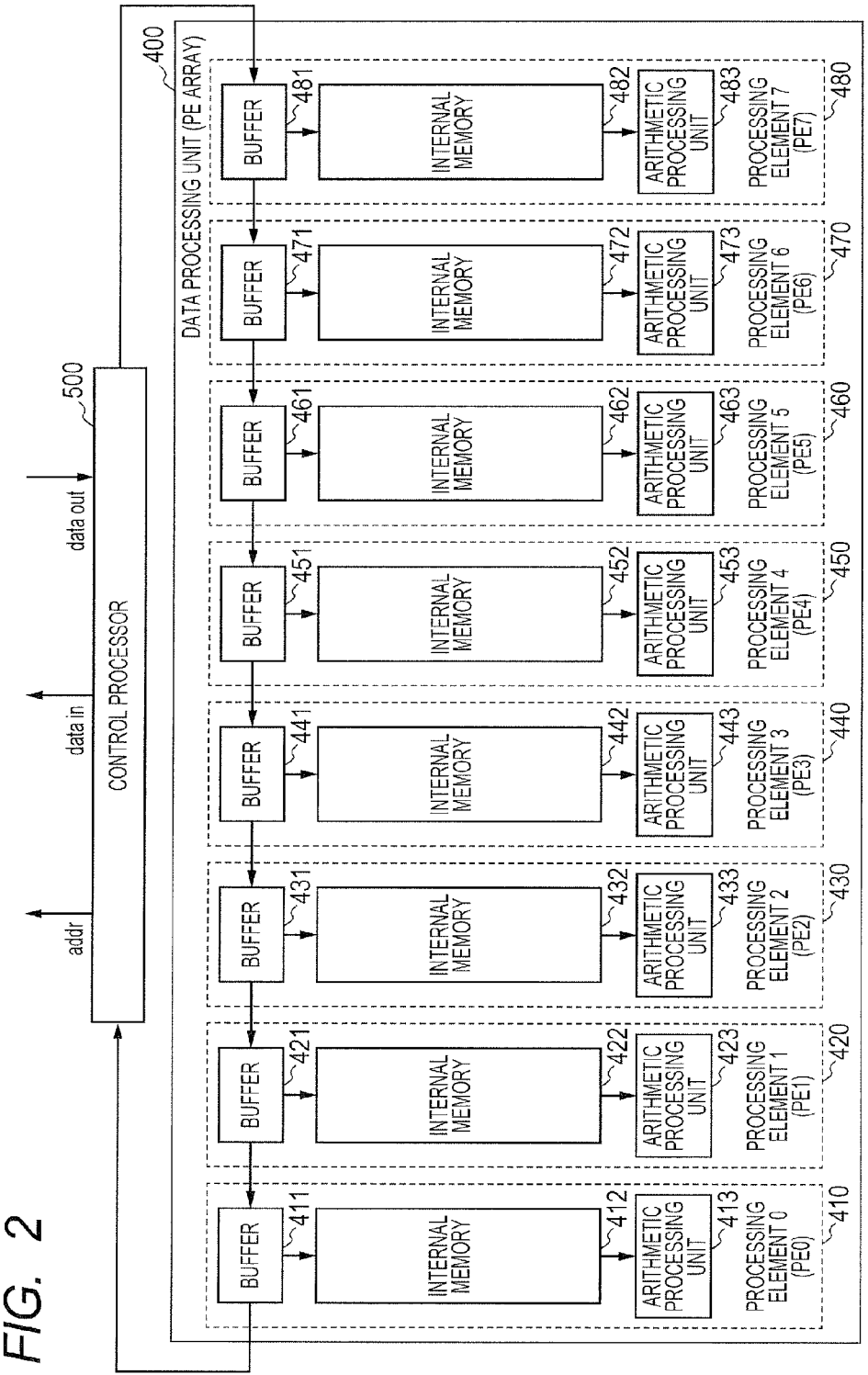
FIG. 2 is a diagram illustrating a configuration of an SIMD processor according to the first embodiment.

FIG. 2 is a diagram illustrating a configuration of the SIMD processor 230. The SIMD processor 230 includes a data processing unit 400 having a plurality of processing elements (hereinafter referred to as "PE") which serve as a plurality of data processing mechanisms, and a control processor (hereinafter referred to as "CP") 500 that controls the respective PEs.

The data processing unit 400 includes eight PEs of PEs 410 to 480, and those PEs are connected in series by a one-way ring bus which is respective annular communication channels. Because the respective PEs have the same configuration, the configuration of the PE 410 will be described below representatively. In the following description, the data processing unit 400 may be called "PE array".

The PE 410 includes a buffer 411, an internal memory 412, and an arithmetic processing unit 413.

The buffer 411 is connected to a buffer 421 included in the adjacent PE 420, and the CP 500 by the ring bus. The buffer 411 holds data transmitted from the adjacent buffer 421, and outputs the data to the CP 500 in response to a next clock. Also, the data temporarily stored in the buffer 411 is written in the internal memory 412 under a write control from the CP 500.

The internal memory 412 temporarily stores the data output from the buffer 411 therein. The internal memory 412 has a capacitance that can store pixel data of a PE width number. The data stored in the internal memory 412 is used in various arithmetic processing conducted by the arithmetic processing unit 413.

The arithmetic processing unit 413 conducts given arithmetic processing on the data temporarily stored in the internal memory 412. As will be described later, in the present invention, data is stored in the respective internal memories in a state where the data is marshaled in advance. Accordingly, the respective arithmetic processing units can conduct the arithmetic processing as it is without conducting data replacement processing, at a stage where data necessary for processing is read into the internal memories.

In this embodiment, a case in which the SIMD processor 230 has eight processor elements of PE 410 to PE 480 will be described. However, the number of PEs is not limited to this number, but can be appropriately selected to 64, 256, or the like on the basis of the contents of processing to be executed, or the circuit scale.

The CP 500 is connected to an address line and data lines, and outputs data and inputs data at an address designated by the address line. The data read into the CP 500 from the memory 220 through the data line is stored in a buffer 481 of the PE 480 which is a first PE through the ring bus. The buffer 481 transmits the stored data to a buffer 471 of the adjacent PE 470 in an output direction in the next timing, and receives and stores next data from the CP 500. On the other hand, the data store in the buffers of the respective PEs is transferred to the internal memories under a write control from the CP 500.

Figure 3:
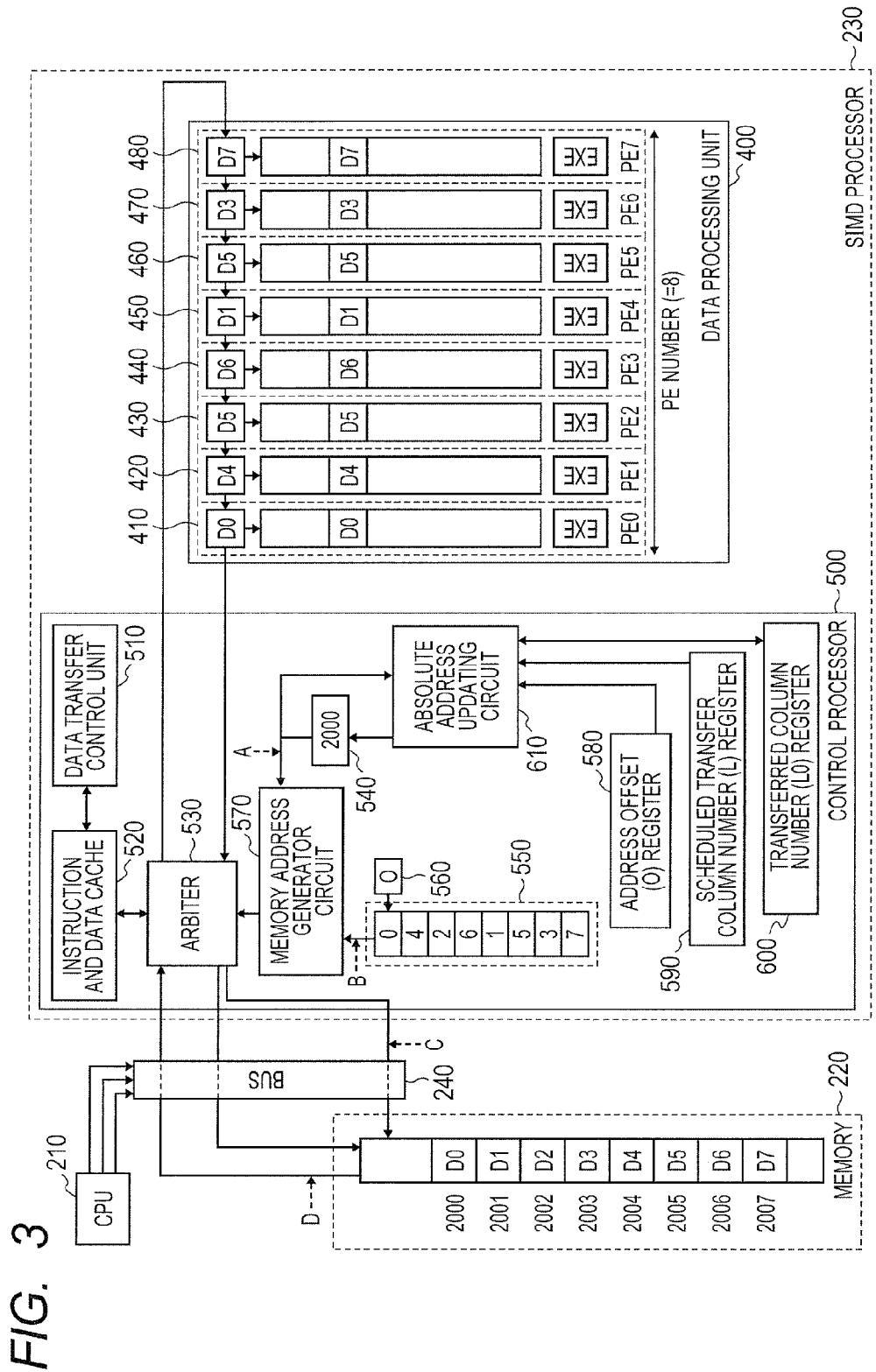
FIG. 3 is a diagram illustrating a configuration of a data processing device according to the first embodiment.

Subsequently, a specific configuration of the CP 500 will be described with reference to FIG. 3. The CP 500 includes a data transfer control unit 510, an instruction and data cache 520, an arbiter 530, an absolute address register 540, a differential address register 550, a pointer register 560, a memory address generator circuit 570, an address offset register 580, a scheduled transfer column number register 590, a transferred column number register 600, and an absolute address updating circuit 610.

The data transfer control unit 510 conducts a control for transferring data to the data processing unit 400 from the memory 220 which is the external memory. Specifically, the data transfer control unit 510 sets parameter information necessary for a variety of registers, which will be described later, according to a fetched instruction to initialize data transfer. Also, the data transfer control unit 510 executes a write instruction at a stage where data is stored in the buffers of all the PEs in the data processing unit 400, and conducts a control to write the data stored in the respective buffers into the respective internal memories.

The instruction and data cache 520 temporarily stores instructions and data to be executed by the data transfer control unit 510 therein. The instructions and data read into the memory 220 are temporarily stored in the instruction and data cache, and replaced with each other as the occasion demands.

The arbiter 530 designates an address to be accessed to the memory 220 by the aid of a read address of the memory, which has been generated by the memory address generator circuit 570, and reads data stored in the address of the memory 220. The arbiter 530 stores the read data into the buffer 481 of the PE 480 that is a PE at a first stage within the data processing unit 400. The data stored in the buffer is transmitted to the buffer of the adjacent PE in the next timing, and newly received data is stored. Thus, the data stored in the buffer is transferred to the adjacent PE one by one every cycle. Then, at a stage where data is stored in all of the buffers of all PEs, the data is transmitted from the respective buffers to the respective internal memories. Thus, the arbiter 530 transfers the data from the external memory to the respective internal memories of the data processing unit 400 on the basis of the read addresses input from the memory address generator circuit 570.

The absolute address register 540 is a storage circuit that stores an absolute address written at the time of initialization conducted by the data transfer control unit 510 therein. In this example, the absolute address is a reference address serving as a common reference value in a given data transfer period. Specifically, the absolute address is used in common for memory address generation in the memory address generator circuit 570 during column transfer for one column where data of one unit is supplied to all of the PEs 410 to 480. In the absolute address register 540, a beginning address in an area of the external memory to be accessed is written as the absolute address at the time of initialization. Also, the absolute address held in the absolute address register 540 is updated according to an updating control from the absolute address updating circuit 610.

The differential address register 550 is a storage circuit that stores a plurality of differential addresses therein. In this case, each of the differential addresses is a value indicative of a difference between the read address generated in each timing during a column transfer period of one column, and the absolute address. The differential address register 550 stores a differential address table in which a plurality of differential addresses is organized therein. In the first embodiment, one differential address table having entries of the same number as that of the PEs (eight) is stored in the differential address register 550.

The pointer register 560 selects a plurality of differential addresses stored in the differential address register 550 in a given order. More specifically, the pointer register 560 is a storage circuit that manages an access position of the differential address table, and stores variables for designating the access positions of the entries in the differential address table. A value of the pointer register 560 is incremented every clock, and then returned to 0 when reaching the number of entries in the differential address table.

The memory address generator circuit 570 combines the absolute address stored in the absolute address register 540 with the differential address stored at each entry position of the differential address table, which is designated by the pointer register 560, to generate an address for external memory access. More specifically, the memory address generator circuit 570 adds a value of the absolute address to a value of the differential address to generate a memory address, and outputs the generated address to the arbiter 530.

The address offset register 580 is a storage circuit that stores an offset value O used for updating the absolute address stored in the absolute address register 540.

The scheduled transfer column number register 590 is a storage circuit that stores a scheduled transfer column number L of the column transfer which is data transfer for supplying data of one unit to all of the PEs therein. That is, the scheduled transfer column number register 590 stores the number of lines for which the image data is to be transferred therein.

The transferred column number register 600 is a storage circuit that stores a transferred column number L0 which is the number of columns that has been transferred in the past. The transferred column number register 600 is incremented at the time of completing the column transfer for one column.

The absolute address updating circuit 610 updates the absolute address stored in the absolute address register 540. The absolute address updating circuit 610 internally includes a comparator circuit, and the comparator circuit compares the scheduled transfer column number L stored in the scheduled transfer column number register 590 with the transferred column number L0 stored in the transferred column number register 600. As a result of comparison, if the transferred column number L0 does not arrive at the scheduled transfer column number L, because there is a need to conduct next column transfer, the absolute address is updated. More specifically, the absolute address updating circuit 610 reads a current absolute address from the absolute address register 540, and stores, into the absolute address register 540, a value obtained by adding the offset value stored in the address offset register 580 to the current absolute address as a new address, thus updating the absolute address. The absolute address updating circuit 610 updates the absolute address every time the memory address generator circuit 570 generates the memory addresses of the same number as that of the PEs.

In the respective constituent elements configuring the above-mentioned CP 500, the absolute address register 540, the differential address register 550, the pointer register 560, the memory address generator circuit 570, the address offset register 580, the scheduled transfer column number register 590, the transferred column number register 600, and the absolute address updating circuit 610, which are particularly related to the data transfer, may be called "DMA (direct memory access) device" or "memory control device" as a whole. Also, those elements with the inclusion of the arbiter 530 that is a data transfer unit which transfers data from the external memory 220 to the data processing unit 400, and the data transfer control unit 510 that sets the values of the parameters stored in the respective registers at the time of initialization may be called "DMA device" or "memory control device"

Figure 4:
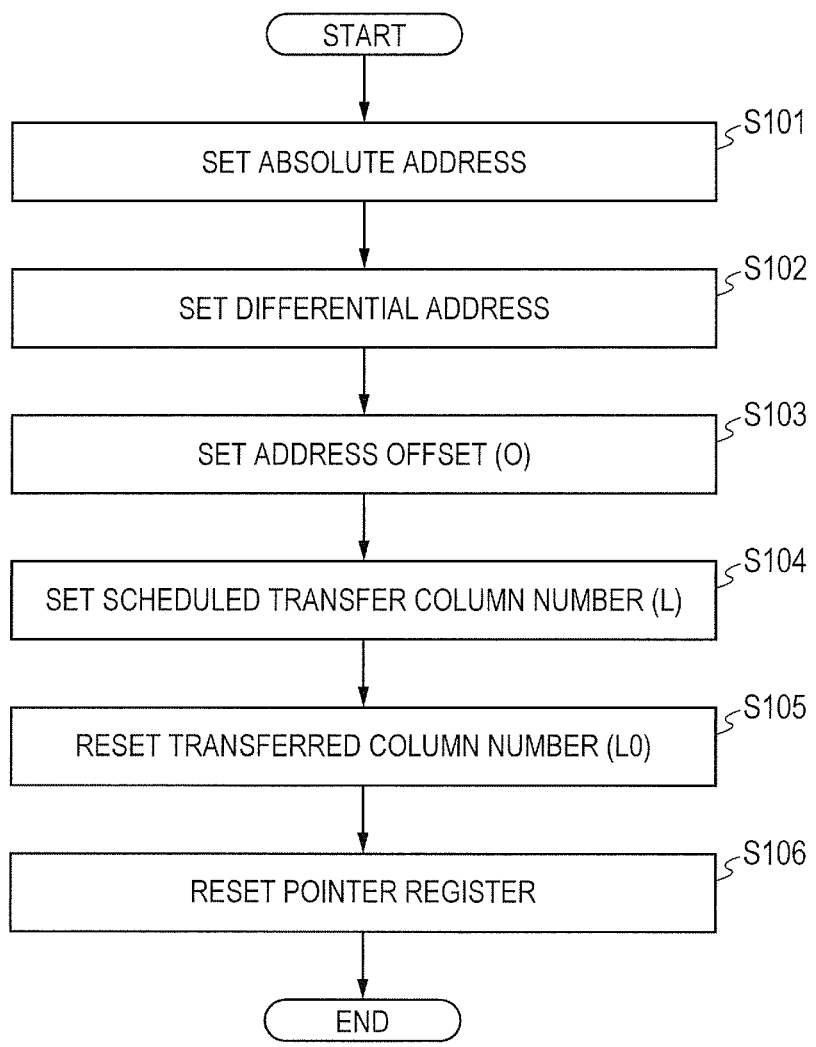
FIG. 4 is a flowchart illustrating a flow of initialization in data transfer according to the first embodiment.

Subsequently, the operation of the SIMD processor 230 will be described partially with reference to FIG. 3. FIG. 4 is a flowchart illustrating a flow of initialization in the data transfer which is conducted by the DMA device.

The data transfer control unit 510 stores a value of the absolute address as a reference in the absolute address register 540 during the column transfer period for one column (Step S101). The absolute address is an address serving as a reference of the area in the external memory to be accessed, and in this example, as the value of a beginning address, "2000" is stored as the absolute address in the absolute address register 540.

Then, the data transfer control unit 510 writes the differential addresses into the respective entries of the differential address table stored in the differential address register 550 (Step S102). The data transfer control unit 510 executes an instruction read from the memory 220, and stores the value of the differential address designated by the instruction in the differential address register 550. However, if a marshaling manner is determined, the differential address can be prepared in advance. In this example, it is assumed that the values of "0", "4", "2", "6", "1", "5", "3", and "7" are stored in the differential address table in order.

Then, the data transfer control unit 510 stores the address offset for updating the absolute address in the address offset register 580 (Step S103), and stores the scheduled transfer column number L in the scheduled transfer column number register 590 (Step S104). The data transfer control unit 510 finally resets the value of the transferred column number L0 stored in the transferred column number register 600 (Step S105), resets the pointer register 560 (Step S106), and completes the initialization.

The setting in the above Steps S101 to S106 is conducted according to a program read by the data transfer control unit 510 to complete the parameter setting for data transfer. The above Steps S101 to S106 can be conducted in random order.

Figure 5:
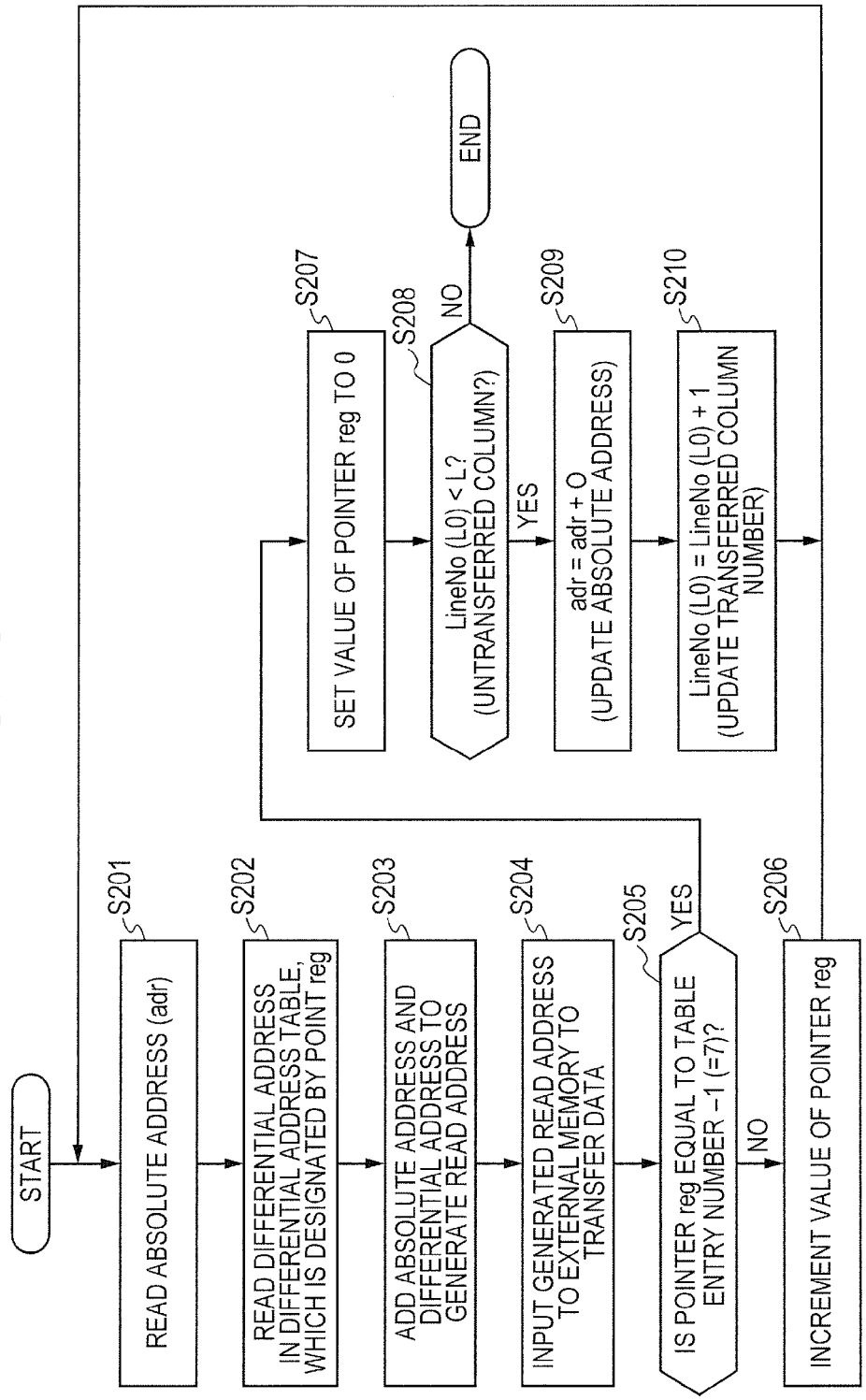
FIG. 5 is a flowchart illustrating a flow of the data transfer according to the first embodiment.
Figure 6:
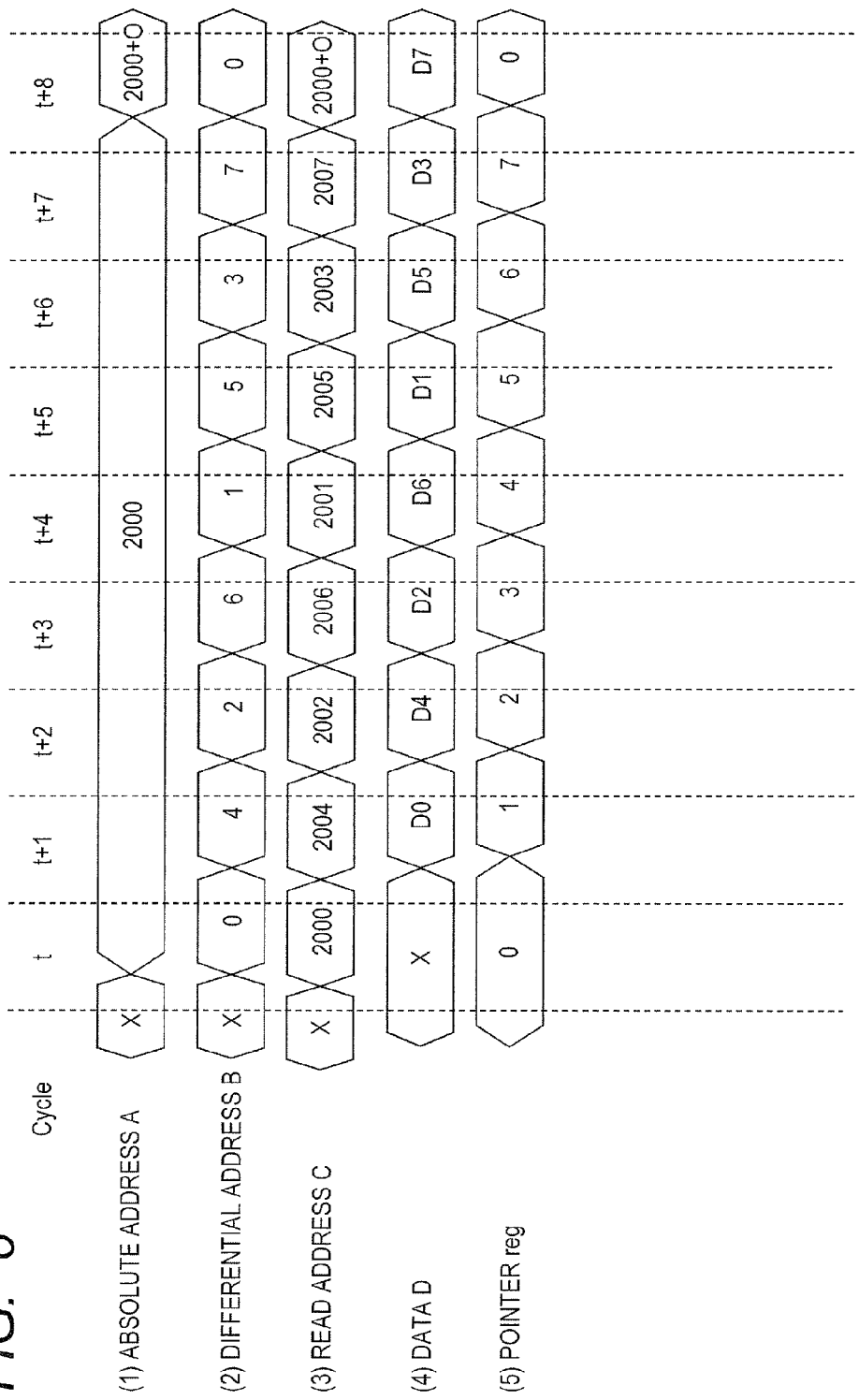
FIG. 6 is a timing chart of the data transfer according to the first embodiment.

Then, the operation of realigning the data which is conducted by the DMA device will be described with reference to a flowchart of FIG. 5 and a timing chart of FIG. 6. FIG. 6 illustrates a timing chart of (1) the absolute address input from the absolute address register 540 to the memory address generator circuit 570, (2) the differential address input from the differential address register 550 to the memory address generator circuit 570, (3) the read address input from the arbiter 530 to the external memory 220, (4) data transferred from the external memory 220 to the buffer 481 of the first PE 480, and (5) the value of the pointer register 560, in the respective timings, respectively.

First, the operation of a cycle t illustrated in FIG. 6 will be described. First, the memory address generator circuit 570 reads the absolute address "2000" stored in the absolute address register 540 (Step S201). Also, the memory address generator circuit 570 reads the differential address "0" stored in the entry (No. 0) indicated by the pointer register 560 from the differential address table (Step S202).

The memory address generator circuit 570 adds the value of the absolute address input from the absolute address register 540 to the value of the differential address designated and input by the pointer register 560 from the differential address table to generate the read address (Step S203). In this example, "2000" becomes the read address with "2000"+"0". The arbiter 530 inputs the read address "2000" of the memory to the memory by the aid of the read address generated by the memory address generator circuit 570, reads data stored in the address, and transfers the data to the PE 480 which is the first PE on the ring bus (Step S204).

Then, the determination and updating of the pointer register are conducted. The value of the pointer register is indicative of the number of addresses input to the memory till the previous cycle. For that reason, it is determined whether the value of the pointer register is equal to the number of entries −"1" (in this example, the number of entries "8"−"1"="7") in the differential address table, or not (Step S205). If not equal, the value of the pointer register is incremented (Step S206). In the cycle t in FIG. 6, the value of the pointer register is not "7". For that reason, the value of the pointer register 560 is incremented, and the operation is returned to Step S201.

Subsequently, the operation of a cycle t+1 will be described. As with the cycle t, returning to Step S201, the memory address generator circuit 570 reads the absolute address "2000" from the absolute address register 540 (Step S201). Then, the memory address generator circuit 570 reads the differential address "4" stored in the entry (No. 1) indicated by the incremented pointer register 560 from the differential address table (Step S202).

The memory address generator circuit 570 adds the value "2000" of the absolute address to the value "4" of the differential address to generate the read address "2004" (Step S203). The arbiter 530 inputs the read address "2004" to the memory, reads data stored at the address, and transfers the data to the PE 480 which is the first PE on the ring bus (Step S204). At the same time, the determination and updating of the pointer register are conducted as with the cycle t (Step S205). Also, in the cycle t+1, the value "1" of the pointer register is not equal to "7", the value of the pointer register is incremented (Step S206), and the operation is returned to Step S201.

A case in which the value of the pointer register is not thus equal to "7" which is the number of PEs −1 as a result of repeating Steps S201 to S206 will be described. In the determination of Step S205, if the value of the pointer register 560 is "7", the value of the pointer register 560 is set to "0" (Step S207).

Because the transfer of the image data for one line of the PE width has been completed at this stage, the absolute address updating circuit 610 compares the transferred column number L0 stored in the transferred column number register 600 with the scheduled transfer column number L set in the scheduled transfer column number register 590 to determine whether there is an untransferred column, or not (Step S208).

As a result of the determination, if L0=L is met, and there is no untransferred column, the transfer processing has been completed assuming that the column transfer of all the scheduled columns has been completed. On the other hand, as a result of the determination, if L0<L is met, and there is the untransferred column, the absolute address updating circuit 610 updates the absolute address (Step S209). More specifically, the absolute address updating circuit 610 reads the absolute address stored in the absolute address register 540, reads the address offset O stored in the address offset register 580, and adds those two values to each other to generate a new absolute address. The absolute address updating circuit 610 stores the absolute address newly generated in the absolute address register to complete the updating of the absolute address. For example, if the value of the address offset O is "10", the absolute address "2010" is newly stored in the absolute address register 540.

Thereafter, the value of the transferred column number register 600 is incremented to update the transferred column number (Step S210), and the operation is returned to Step S201 in order to conduct data transfer on the next transfer column.

Also, at this stage, data read in order from the addresses "2000", "2004", "2002", "2006", "2001", "2005", "2003", and "2007" in the memory 220 is stored in order in the buffer 411 of the PE 410 to the buffer 481 of the PE 480. That is, data of D0, D4, D2, D6, D1, D5, D3, and D7 is stored in the buffers 411 to 481 in order. Those pieces of data temporarily retained in the respective buffers 411 to 481 is written into the respective internal memories from the respective buffers under the write control from the CP 500, concurrently.

Thus, the processing of Steps S201 to S210 is conducted to complete the column transfer for one column. When all of the columns of the number designated by the scheduled transfer column number have been transferred, the data transfer processing issued by one request from the data transfer control unit has been completed.

The image data for one line of the PE width which has been arrayed in the order of "D0, D1, D2, D3, D4, D5, D6, D7" with an address 2000 on the memory as a head is marshaled and read in the order of "D0, D4, D2, D6, D1, D5, D3, D7". The image data is sequentially input to the SIMD processor in the order of the marshaled data, and stored in the internal memories of the respective PEs in a state where the marshaling has been completed. The above processing is sequentially conducted by the number of columns of the scheduled transfer column number L to store two-dimensional image data in the internal memories of the PEs.

Figure 7:
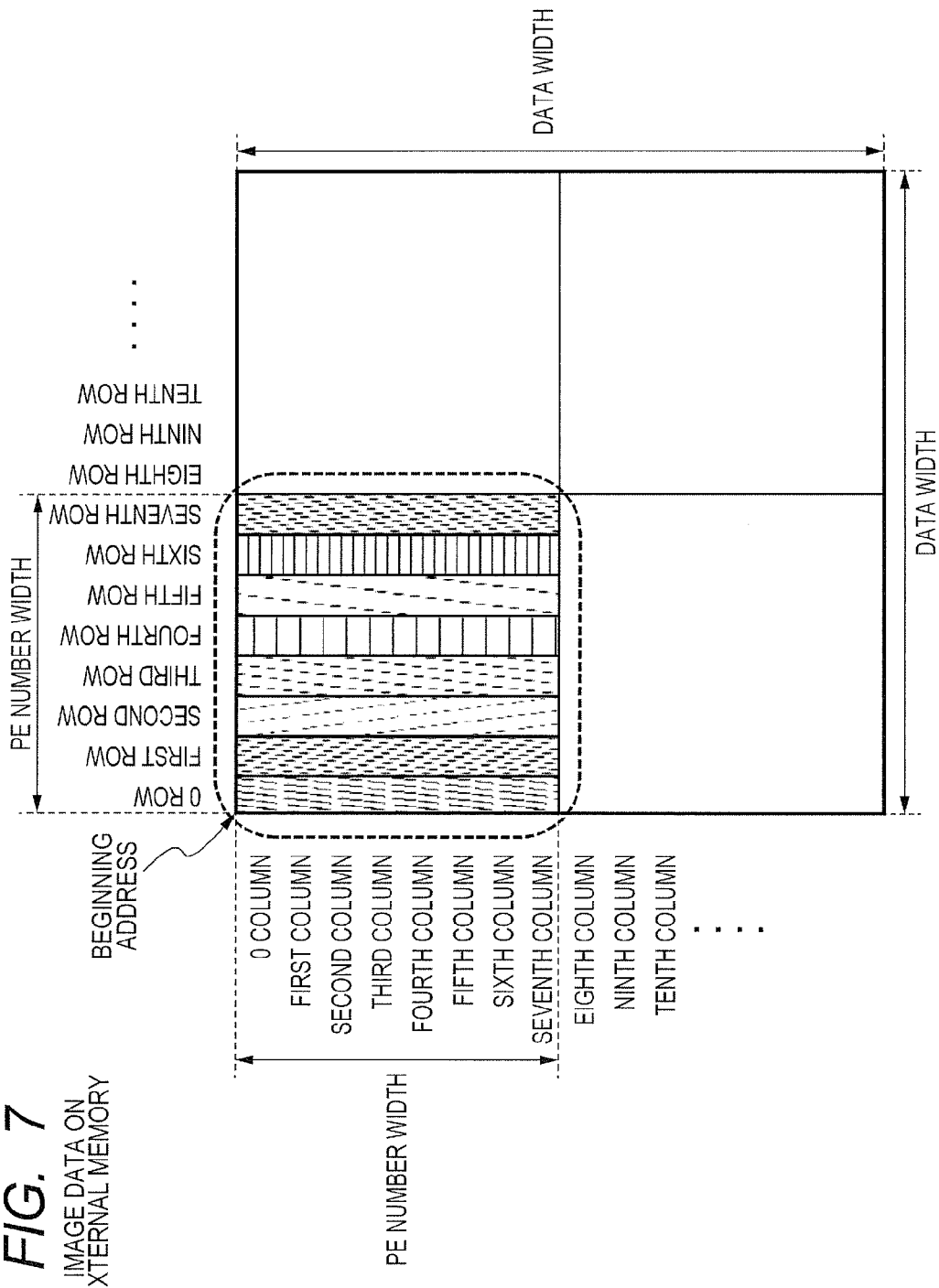
FIG. 7 is a diagram illustrating a method of clipping and transferring image data according to the first embodiment.

FIG. 7 illustrates the image data which is photographed by the camera 110, and stored in the external memory 220. The data width of a sheet of image is, for example, 1920 pixels in width and 1080 pixels in length. The above image data is stored in the memory 220 as it is. That is, pixel data of 0x1, pixel data of 0x2, pixel data of 0x3, . . . are sequentially stored in the external memory 220 in the stated order with an address at which pixel data of 0x0 is stored as a beginning address. The SIMD processor 230 clips the image data stored in the external memory 220 in this order by the width of the PE number in a row direction, and transfers the image data to the internal memories. That is, the column transfer for one column means that the image data of the PE number width (eight) in the row direction is transferred from the external memory 220 to the respective internal memories.

Figure 8:
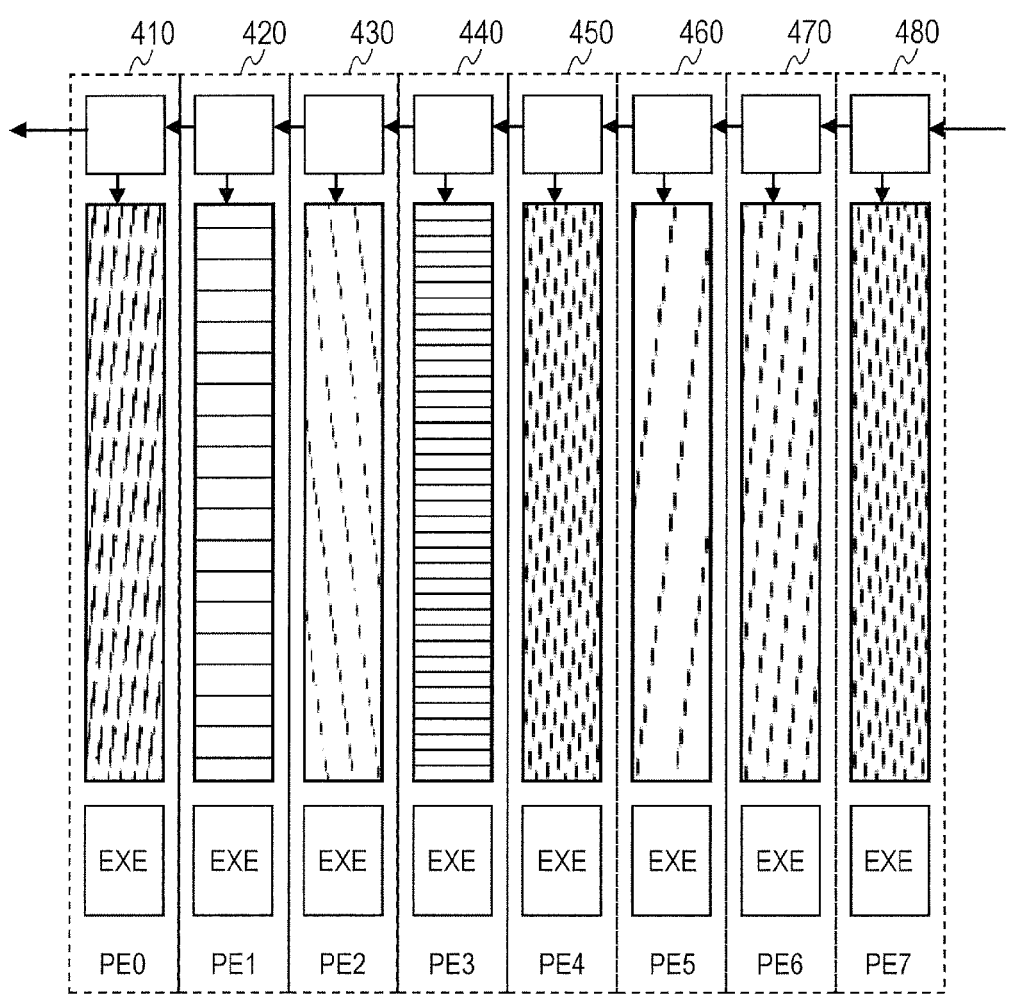
FIG. 8 is a diagram illustrating an appearance in which the clipped image data illustrated in FIG. 7 is stored in an internal memory.

In this case, as described above, the DMA device transfers the image data while marshaling the data. The marshaling is conducted in the respective column transfer in the same manner according to the same differential address table. Accordingly, at the time when the pixel data of 8×8=64 on the upper left of FIG. 7 has been transferred, the image data stored in the internal memories of the respective PEs is represented as illustrated in FIG. 8. That is, the image data on a first column stored in the external memory 220 is stored not in the internal memory 422 of the PE 420, but in the internal memory 452 of the PE 450, as a result that the above image data is fourthly transferred in the data transfer of the image data of the PE width on the respective rows. Also, the image data on a third column is stored not in the internal memory 442 of the PE 440, but in the internal memory 472 of the PE 470, as a result that the above image data is sixthly transferred in the data transfer on the respective rows. The same is applied to the image data on a fifth column and a seventh column.

Finally, when the same replacement processing is to be conducted on other single rectangles, the data transfer control unit 510 designates the beginning address of the rectangle to be processed in the absolute address register, thereby enabling the same processing to be conducted.

Also, the differential address can be rewritten at the time of initializing the processor and during the processing by the processor. The rewrite of the differential address is conducted by various manners such as a rewrite instruction using a program, or an instruction in a host CPU.

Figure 9:
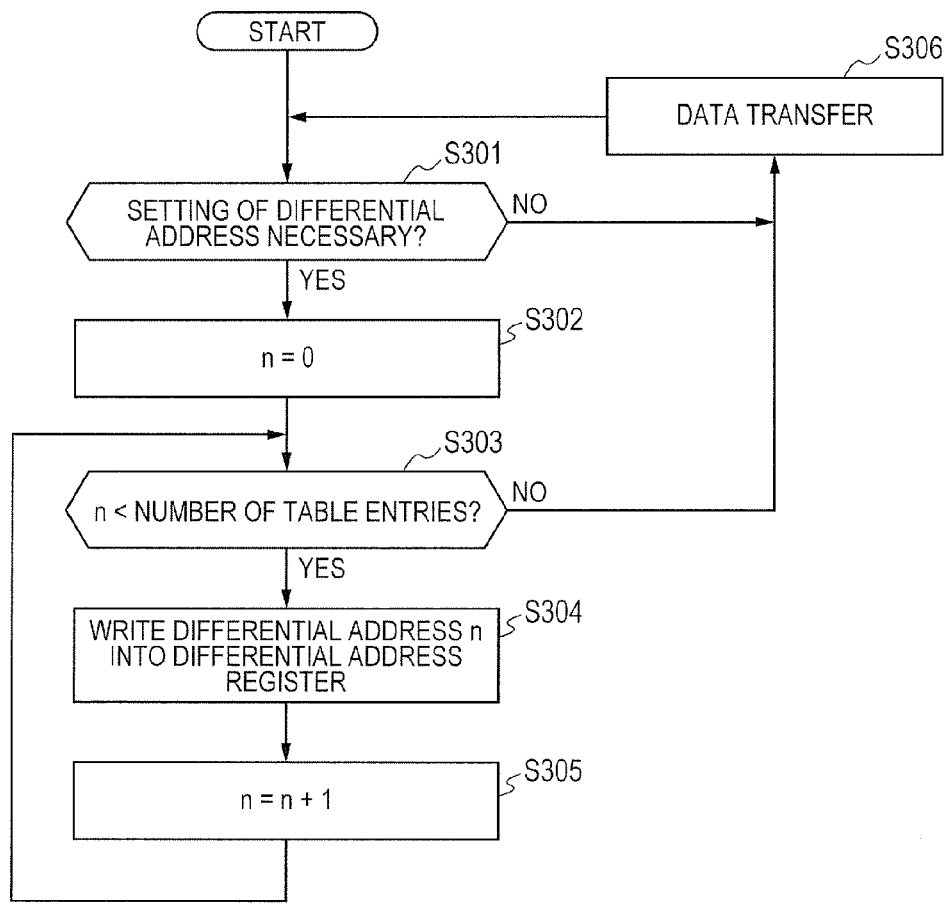
FIG. 9 is a flowchart illustrating a flow of updating a differential address according to the first embodiment.

FIG. 9 is a flowchart related to the updating of the differential address table according to this embodiment. The data transfer control unit 510 starts the operation of writing the differential address before data transfer if a rewrite requirement of the differential address is met such that the updating of the differential address table is included in a fetched instruction (Step S301).

The data transfer control unit 510 writes the differential address into the differential address table in the order from entry No. 0 in the differential address table (Step S302). The data transfer control unit 510 counts the number of written differential addresses, and compares the count value n with the number of table entries in the differential address table (Step S303). If the number of written differential addresses is smaller than the number of table entries, the data transfer control unit 510 writes the differential address into the current entry of the differential address table (Step S304), and increments the entry (Step S305). In Step S303, assuming that all of the differential address registers have been updated at the time when it is determined that the differential addresses of the same number as that of table entries are written, the operation is shifted to the data transfer processing (Step S306).

As described above, the memory control device according to the first embodiment, which transfers data from the external memory to the data processing unit having the plurality of processing mechanisms, includes two kinds of differential addresses of the absolute address storage unit that stores the absolute address serving as the common reference value in the given data transfer period, and the differential address storage unit that stores the plurality of differential addresses therein. The memory address generation unit combines any differential address selected in each timing by the differential address selection unit that selects the plurality of differential addresses stored in the differential address storage unit in the given order with the absolute address stored in the absolute address storage unit to generate the memory address. The arbiter serving as the data transfer unit inputs the memory address generated by the memory address generation unit to the external memory, reads the data from the memory address, and transfers the data to the data processing unit.

According to the above configuration, when the data is read from the external memory, the memory read position is changed by the address generator circuit with the result that the data on the internal memory can be marshaled without using the data communication unit between the respective PEs.

The data position of the external memory to be accessed by each PE is set in the form of the differential address for each PE. The differential address is added to the common absolute address for each PE, to thereby obtain the address of the external memory to be accessed by each PE. Thus, since the access position of the external memory is stored in the form of the differential address, the same processing can be conducted on the different rectangle by merely changing the absolute address. For example, when the same processing is conducted on all of rectangle data obtained by dividing a certain image into 16 pieces, the differential address for each PE and the common absolute address are set as the initialization of a first rectangle. When the processing of this rectangle has been completed, the data transfer can be started by only rewriting the absolute address in the initialization of the processing of a next rectangle. On the contrary, when the absolute address is used for each PE, there is a need to calculate the absolute address for each PE in the initialization when processing the next rectangle. When the absolute address is used for each PE, there is a need to calculate the absolute address for each PE 16 times. On the other hand, when the differential address is used, the single absolute address is merely calculated. Thus, the processing time required for the initialization can be reduced by using the differential address.

Thus, the present invention utilizes that a desired data arrangement frequently has a regularity in the parallel processing using the SIMD processor. When the absolute address within the rectangle to be subjected to the data marshaling is determined to one point, the difference between the absolute address and the address of the data required by each PE is frequently kept constant. Focusing on this point, with the combination of one absolute address common to the PEs and the differential address prepared for each PE, the absolute address to be accessed by each PE can be generated. Also, because the access position of each PE is stored as the differential address, the start position of the processing in the external memory can be changed by merely rewriting the absolute address, and the same processing can be conducted on another single rectangle.

Also, the configuration of the present invention can be applied to a single memory, and an area saving structure can be realized as compared with a case where the memory bank is divided. Also, the configuration of the present invention is excellent in view of the general purpose because a range of the replacement does not affect the buffer size.

In the above description, the value of the transferred column number register is incremented and updated every time the column transfer for one column has been completed, and it is determined whether the column transfer for the scheduled transfer column number has been completed, or not. However, the present invention is not limited to this configuration. Alternatively, the value of the scheduled transfer column number stored in the scheduled transfer column number register may be decremented and updated every time the column transfer for one column has been completed, and the data transfer may be conducted until the scheduled transfer column number becomes 0. In this case, the transferred column number register can be omitted.

Second Embodiment

A DMA device according to a second embodiment is characterized by a configuration in which the differential address table stored in the different address register can be further reduced in size to downsize the circuit scale. Hereinafter, the second embodiment according to the present invention will be described. The parts described in the first embodiment will be partially omitted from description for the purpose of clarifying the present invention.

Figure 10:
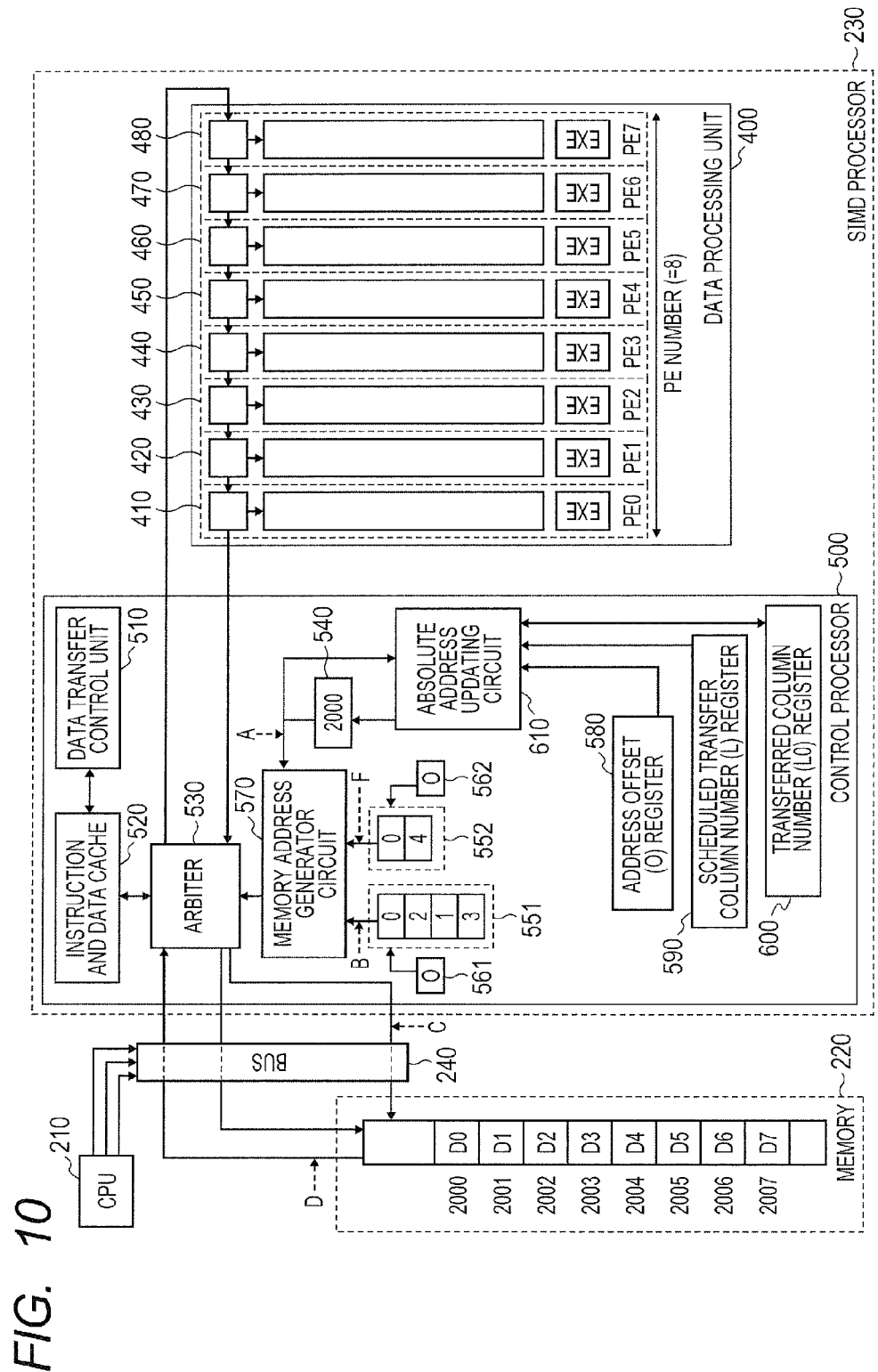
FIG. 10 is a diagram illustrating a configuration of a data processing device according to a second embodiment.

FIG. 10 is a block diagram illustrating a configuration of a data processing device according to the second embodiment. The second embodiment is characterized in that the DMA device has two differential address tables. Also, the DMA device has two pointer registers 561 and 562 for managing the access position for each of the differential address tables.

The DMA device includes a first differential address register 551 and a second differential register 552. A first differential address table and a second differential address table are stored in the respective storage units.

The first differential address table has four entries, and one differential address is stored in each entry, and four differential addresses in total are stored in the entries. In this example, the differential addresses of "0", "2", "1", and "3" are stored in the first differential address table by initialization from the data transfer control unit 510.

The second differential address table has two entries, and one differential address is stored in each entry, and two differential addresses in total are stored in the entries. In this example, the differential addresses of "0" and "4" are stored in the second differential address table by initialization from the data transfer control unit 510.

The first pointer register 561 is a storage circuit that manages the access position of the first differential address table, and stores variables that designate the access positions of the entries in the first differential address table therein. A value of the first pointer register 561 is incremented every given number of clocks.

The second pointer register 562 is a storage circuit that manages the access position of the second differential address table, and stores variables that designate the access positions of the entries in the second differential address table therein. A value of the second pointer register 562 is incremented every given number of clocks.

The data transfer control unit 510 writes the differential address into the respective entries of the differential address table, and updates the differential address if the updating of the differential address table is necessary. In this example, the data transfer control unit 510 may update both of the first and second address tables, or may update only one differential address table. The data transfer control unit 510 updates the necessary differential address table according to a fetched instruction.

The memory address generator circuit 570 generates addresses for external memory access on the basis of the absolute address stored in the absolute address register 540, and two differential addresses stored at the respective entry positions of the first and second differential address tables designated by the first and second pointer registers 561 and 562, respectively.

A calculation expression of the memory address generated by the memory address generator circuit 570 is represented by Mathematical Expression 1. The memory address generator circuit 570 adds three values consisting of the value of the absolute address and the values of two kinds of differential addresses designated by the respective two pointer registers as represented by Mathematical Expression 1 together to generate the above address, and outputs the generated address to the arbiter 530.

$$\text{Mem\_addr} = \text{init\_addr} + \text{offset\_Tab}_1[\text{point\_reg}_1] + \text{offset\_Tab}_2[\text{point\_reg}_2] \quad (\text{Ex. 1})$$

Subsequently, the operation of the CP 500 according to the second embodiment will be described.

As in the first embodiment, in starting the data transfer, the data transfer control unit 510 conducts initialization according to a flow of FIG. 4. As the initialization of the different address table in Step S102, the respective differential addresses are written into both of the first differential address table and the second differential address table. If a marshaling manner in data transfer is determined, that is, if the processing contents using the SIMD processor 230 are fixed, and the data transfer is always conducted by a specific marshaling manner, the differential address can be prepared in advance. Further, the data transfer control unit 510 conducts the setting of the absolute address, the setting of the address offset, the setting of the scheduled transfer column number, the reset of the transferred column number, and the resetting of the first pointer register and the second pointer register, as the respective initializations.

Figure 11:
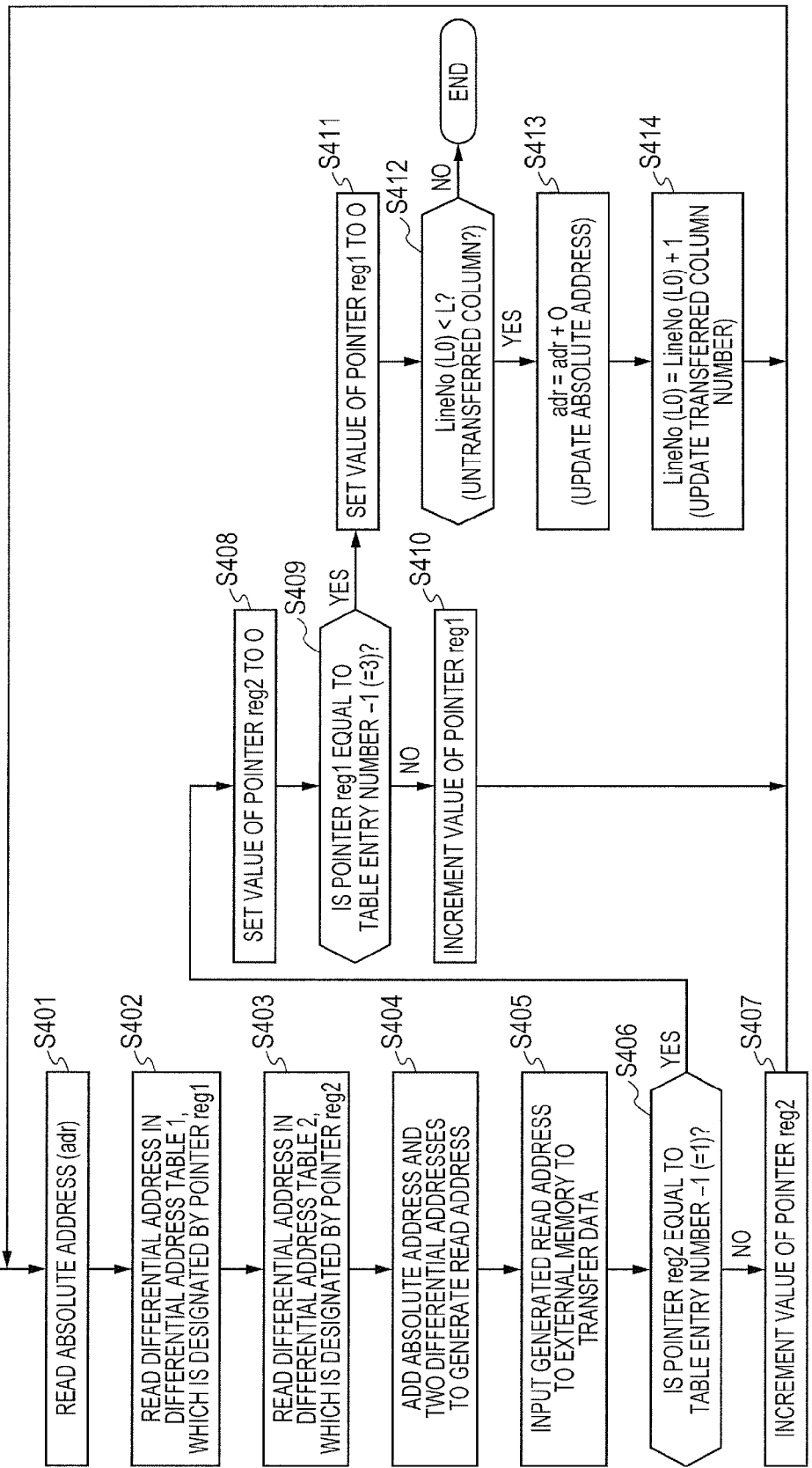
FIG. 11 is a flowchart illustrating a flow of the data transfer according to the second embodiment.

Subsequently, a flow of the realigning operation in the data transfer which is conducted by the DMA device according to the second embodiment will be described with reference to a flowchart of FIG. 11.

First, the memory address generator circuit 570 reads the absolute address "2000" stored in the absolute address register 540 (Step S401). Also, the memory address generator circuit 570 reads the differential address "0" stored in the entry (No. 0) indicated by the first pointer register 561 from the first differential address table (Step S402). Further, the memory address generator circuit 570 reads the differential address "0" stored in the entry (No. 0) indicated by the second pointer register 562 from the second differential address table (Step S403).

The memory address generator circuit 570 adds the value of the absolute address to the values of the respective two differential addresses designated by the first pointer register 561 and the second pointer register 562 from the first and second differential address tables to generate the read address (Step S404). In this example, "2000" becomes the read address with "2000"+"0"+"0".

The arbiter 530 inputs the read address "2000" generated by the memory address generator circuit 570 to the memory, reads data from the address 2000 on the memory, and transfers the data to the buffer of the PE (Step S405).

Then, the determination and updating of the pointer registers are conducted. The value of each pointer register is indicative of the number of addresses input to the memory till the previous cycle. First, it is determined whether the value of the second pointer register 562 is equal to the number of entries –"1" (in this example, the number of entries "2"– "1"="1") in the second differential address table, or not (Step S406). If not equal, the value of the second pointer register 562 is incremented (Step S407), and the operation is returned to Step S401.

In the determination of Step S406, if the value of the second pointer register 562 is equal to the number of entries –"1" in the second differential address table, the value of the second pointer register 562 is set to "0" (Step S408). Further, it is determined whether the value of the first pointer register 561 is equal to the number of entries –"1" (in this example, the number of entries "4"–"1"="3") in the first differential address table, or not (Step S409). If not equal, the value of the first pointer register 561 is incremented (Step S410), and the operation is returned to Step S401.

In the determination of Step S409, if the value of the first pointer register 561 is equal to the number of entries –"1" in the first differential address table, the value of the first pointer register 561 is set to "0" (Step S411).

At this stage, the column transfer for one column, that is, the data transfer of the image data of the PE width for one row has been completed. Accordingly, the absolute address updating circuit 610 compares the transferred column number L0 stored in the transferred column number register 600 with the scheduled transfer column number L initialized in the scheduled transfer column number register 590 to determine whether there is an untransferred column, or not (Step S412). As a result of the determination, if L0=L is met, and there is no untransferred column, the transfer processing has been completed assuming that the column transfer for all the columns has been completed. On the other hand, as a result of the determination, if L0<L is met, and there is the untransferred column, the absolute address updating circuit 610 updates the absolute address (Step S413). Thereafter, the value of the transferred column number register 600 is incremented to update the transferred column number L0 (Step S414). The operation is returned to Step S401 in order to conduct the column transfer for the next column.

Figure 12:
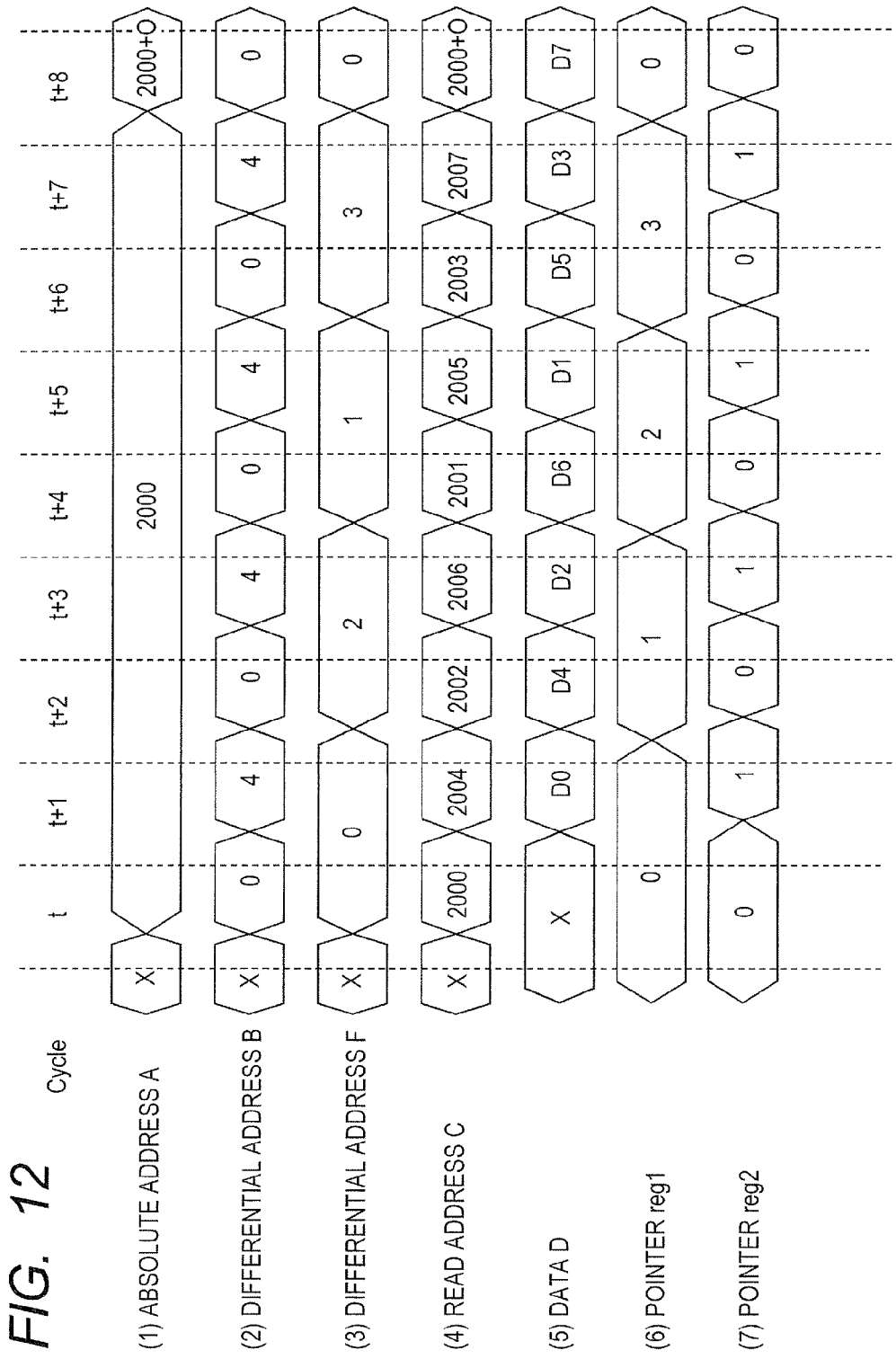
FIG. 12 is a timing chart of the data transfer according to the second embodiment.

An appearance of the data transfer according to a flow of FIG. 11 will be described with reference to a timing chart of FIG. 12. FIG. 12 illustrates a timing chart of (1) the absolute address input from the absolute address register 540 to the memory address generator circuit 570, (2) the differential address input from the first differential address register 551 to the memory address generator circuit 570, (3) the differential address input from the second differential address register 552 to the memory address generator circuit 570, (4) the read address input from the arbiter 530 to the external memory 220, (5) data transferred from the external memory 220 to the buffer 481 of the first PE 480, (6) the value of the first pointer register, and (7) the value of the second pointer register, in the respective timings, respectively.

Thus, the first pointer register 561 is incremented every two cycles, and then returned to the original "0" by eight cycles. On the other hand, the second pointer register 562 is incremented every cycle, and then returned to the original "0" every two cycles. Accordingly, the respective entries of the second differential address table are repetitively designated every two cycles in the column transfer period for one column.

It is understood that, in the respective timings of cycles t to t+7, the values obtained by the absolute address and the two differential addresses becomes "2000", "2004", "2002", "2006", "2001", "2005", "2003", and "2007" in order. Accordingly, through the processing of the cycles t to t+7, the data arrayed in the order of "D0, D1, D2, D3, D4, D5, D6, D7" with the address 2000 on the memory as a head is marshaled and read in the order of "D0, D4, D2, D6, D1, D5, D3, D7". The results are identical with those in the first embodiment. The image data is sequentially input to the SIMD processor 230 in the order of the marshaled data, and stored in the internal memories of the respective PEs in a state where the marshaling has been completed.

Finally, when the same replacement processing is to be conducted on other single rectangles, the data transfer control unit 510 designates the beginning address of the rectangle to be processed to the absolute address, thereby enabling the same processing to be conducted.

As described above, in the DMA device according to the second embodiment, the differential address selection unit includes the plurality of selection units that select some of the plurality of differential addresses stored in the differential address storage unit in the respective given orders.

More specifically, the differential address storage unit stores the plurality of differential address tables in which the plurality of differential addresses are organized. The differential address selection unit includes the plurality of pointer registers that select the plurality of differential addresses organized by the plurality of differential address tables in the respective given orders. The memory address generation unit combines the plurality of differential addresses selected by the plurality of pointer registers with the absolute address to generate the memory address.

According to the above configuration, as compared with a case in which the differential addresses are managed by one differential address table according to the first embodiment, the differential address table is divided into two pieces with the results that the storage capacitance of the differential addresses can be reduced although the degree of freedom of the combinations of the addresses is decreased. That is, the total number of entries in the differential address table, which is eight entries in the first embodiment, is reduced to sixth entries. Accordingly, the mounting area and the power consumption can be reduced. Further, the number of differential addresses to be initialized is reduced so that the number of differential addresses to be written at the time of initialization can be reduced. As a result, the processing time required for initialization can be reduced, and the high processing speed can be realized.

Third Embodiment

An SIMD processor according to a third embodiment includes a larger number of processor elements. Since many pieces of data can be processed collectively, the high processing speed can be realized. Hereinafter, the third embodiment of the present invention will be described with reference to the drawings. The parts described in the first and second embodiments will be partially omitted from description for the purpose of clarifying the present invention.

Figure 13:
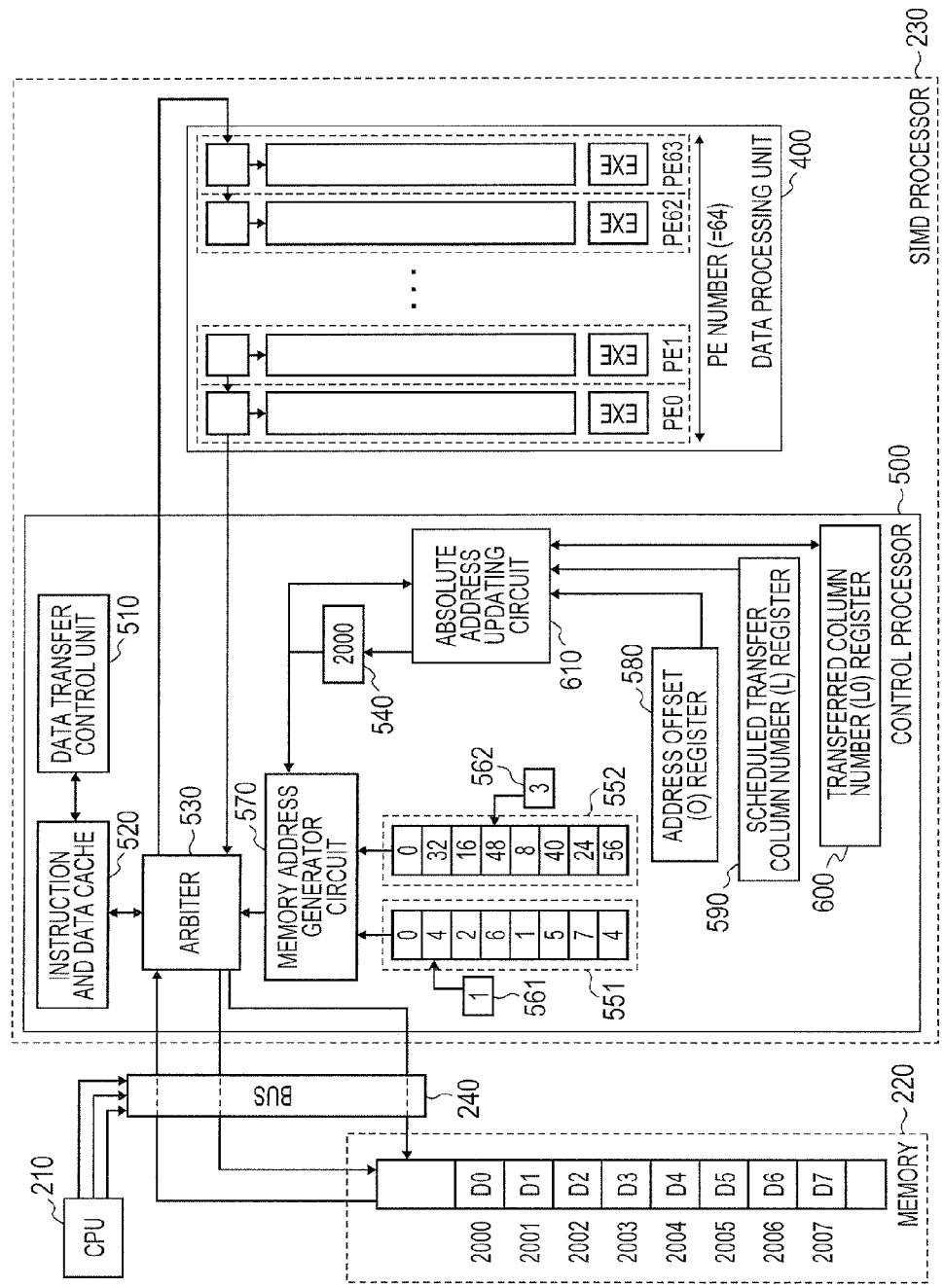
FIG. 13 is a diagram illustrating a configuration of a data processing device according to a third embodiment.

FIG. 13 is a block diagram illustrating a configuration of a data processing device according to the third embodiment. The SIMD processor 230 includes 64 processor elements of PE(0) to PE(63).

The DMA device holds two differential address tables as in the second embodiment. The differential address is generated by the combination of the differential address designated by the first pointer register 561 from the first differential address table with the differential address designated by the second pointer register 562 from the second differential address table. Because the first differential address table and the second differential address table each have the same eight entries, there are the combination patterns of the differential addresses of 8×8=64 which is the same number as that of PEs included in the data processing unit 400.

The memory address generator circuit 570 adds the absolute address to those two differential addresses to generate 64 kinds of differential addresses corresponding to the number of PEs. The memory address generator circuit 570 can use Mathematical Expression 1 as the calculation expression of the memory address as in the second embodiment.

Referring to FIG. 13, the value of the first pointer register 561 is "1", and the value of the second pointer register 562 is "3". Accordingly, the values of "4" stored in a first entry of the first differential address table, and "48" stored in a third entry of the second differential address table are input to the memory address generator circuit 570 as the respective differential addresses. The memory address generator circuit 570 adds those two differential addresses to the value of the absolute address "2000" input by the absolute address register 540 to generate a read address "2052". The arbiter 530 inputs the read address to the memory 220, and transfers the data stored in the address 2052.

Figure 14:
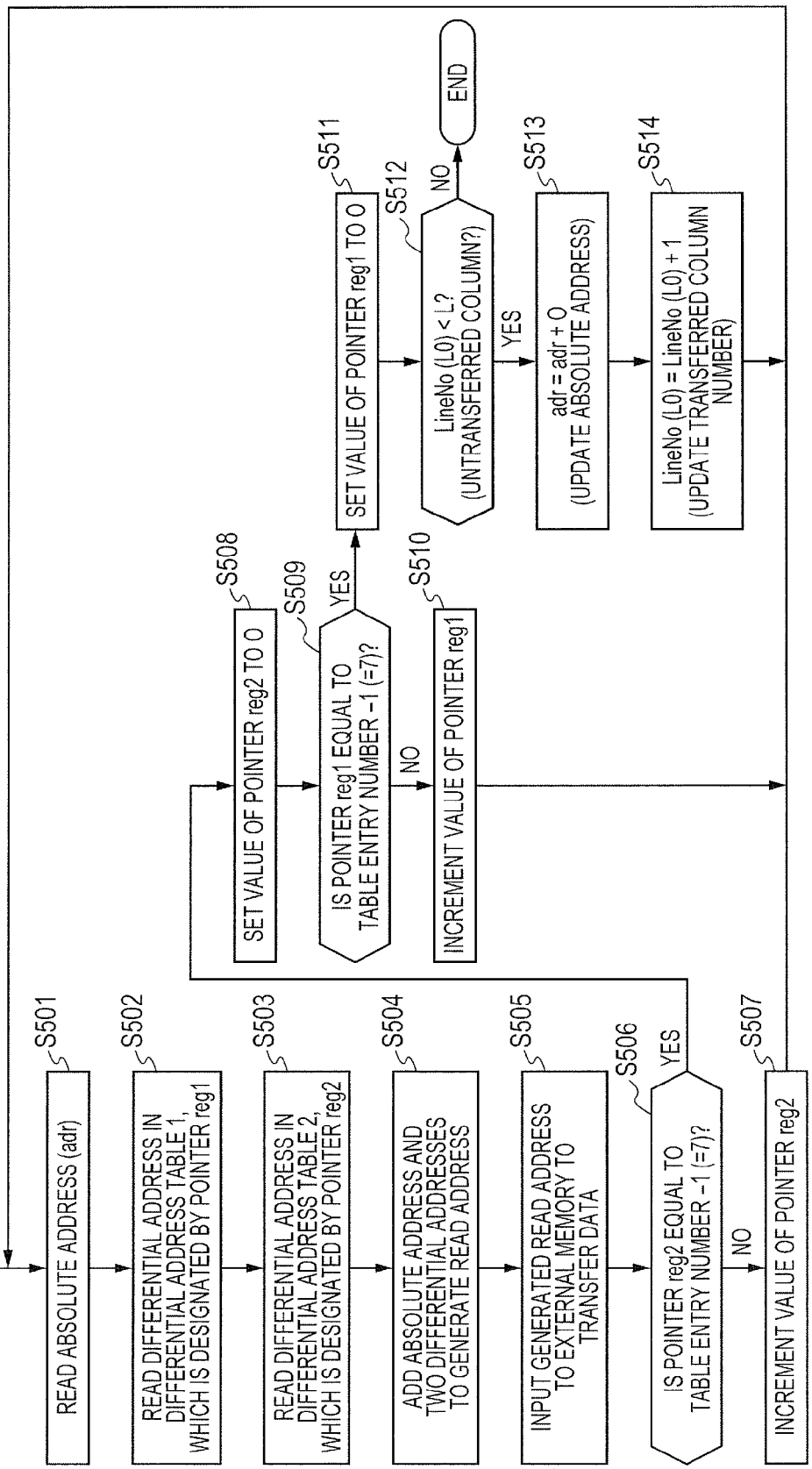
FIG. 14 is a flowchart illustrating a flow of the data transfer according to the third embodiment.

A processing flow of the data transfer in the DMA device according to the third embodiment is illustrated in FIG. 14. The processing flow illustrated in FIG. 14 is identical with the data transfer operation of the DMA device according to the second embodiment, and therefore a description thereof will be omitted. In the third embodiment, the number of entries in each of the first differential address table and the second differential address table is "8". Therefore, as compared with the flowchart of FIG. 11, it is determined whether the value of the second pointer register 562 and the value of the first pointer register 561 are equal to "7", or not, in Steps S506 and S509, respectively.

As described above, because the SIMD processor according to the third embodiment has a larger number of processor elements than those of the second embodiment, the effects of reducing the mounting area and the power consumption and the effects of realizing the higher processing speed by dividing the differential address table by two pieces become remarkable. That is, when the differential addresses are managed by one differential address table, 64 entries are required. On the contrary, in this embodiment, more than 16 entries are not required, and the reduction of the mounting area of the storage circuit that stores the differential address table for 48 entries, and the write setting of the differential addresses for 48 entries become unnecessary.

Fourth Embodiment

A DMA device according to a fourth embodiment is characterized in that the differential address table is further divided into plural pieces to delete the circuit scale and increase the processing speed at the time of initialization. Hereinafter, the fourth embodiment of the present invention will be described with reference to the drawings. The parts described in the first to third embodiments will be partially omitted from description for the purpose of clarifying the present invention.

Figure 15:
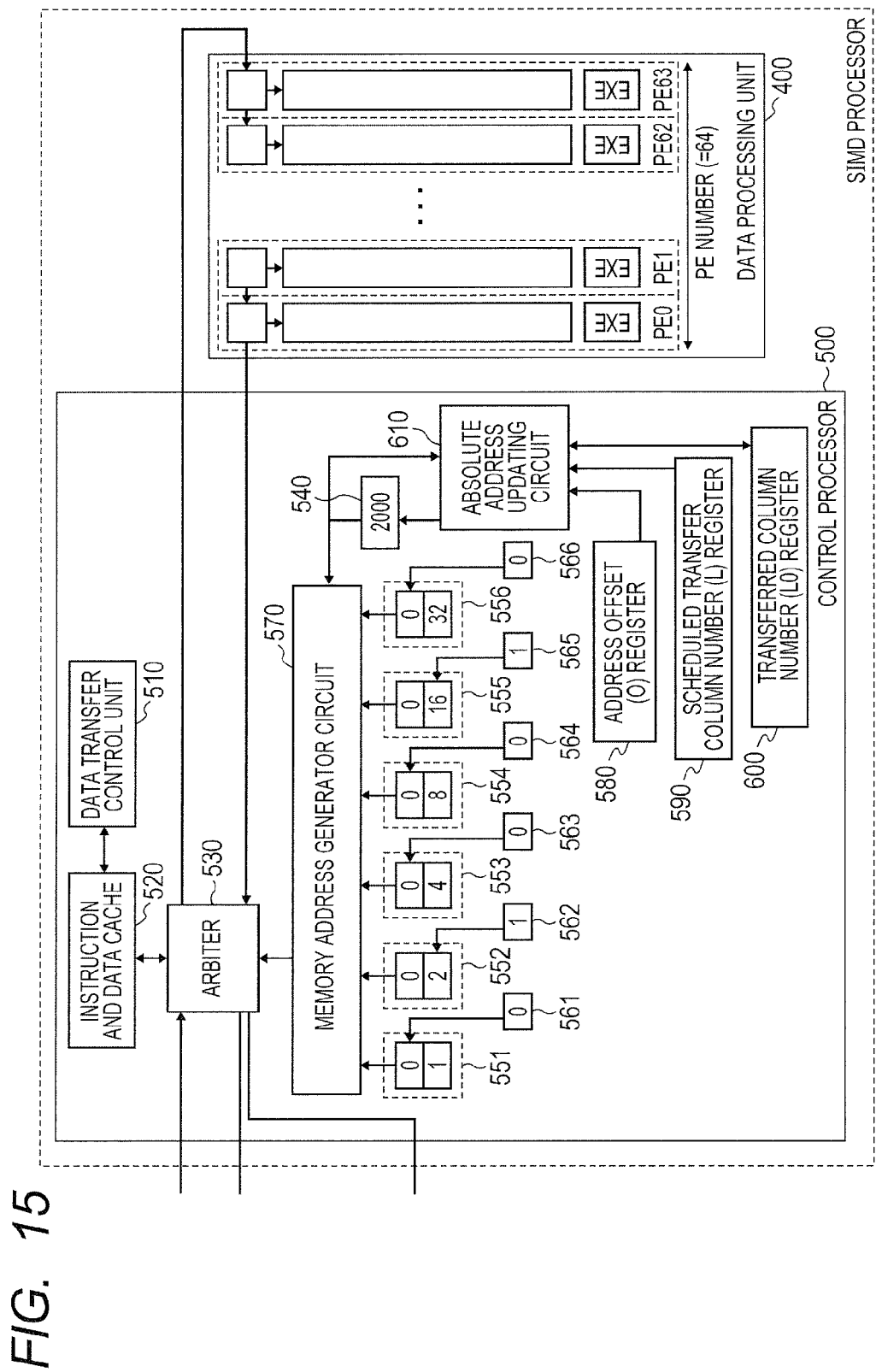
FIG. 15 is a diagram illustrating a configuration of an SIMD processor according to a fourth embodiment.

FIG. 15 is a block diagram illustrating a configuration of an SIMD processor according to the fourth embodiment. The SIMD processor 230 includes 64 processor elements. Further, the DMA device within the SIMD processor 230 includes six kinds of differential address tables. That is, in the DMA device, the respective differential address tables are stored in six storage units of a first differential address register 551 to a sixth differential address register 556. As illustrated in FIG. 15, each of the differential address tables has two entries. Also, in order to designate the entries in each of the differential address tables, the DMA device has six pointer registers of a first pointer register 561 to a sixth pointer register 566.

Also in the above configuration, the differential addresses of the same number as that of the PEs can be generated by the combination patterns of the differential addresses of 2×2×2×2×2×2=64. The memory address generator circuit 570 adds six differential addresses designated by the first to sixth pointer registers to the absolute address input from the absolute address register 540 to generate a read address. The calculation expression of the memory address generated by the memory address generator circuit 570 is represented by Mathematical Expression 2.

$$\text{Mem\_addr} = \text{init\_addr} + \sum_{i=0}^{i=log_2 PENO} \text{offset\_Tab}_i[\text{point\_reg}_i] \quad \text{(Ex. 2)}$$

In an example of FIG. 15, the entries in the respective differential address tables which are designated by the first, third, fourth, and sixth pointer registers are No. 0, and the entries designated by the second and fifth pointer registers are No. 1. Accordingly, the values of "0", "2", "0", "0", "16", and "0" are selected from the first to sixth differential address tables as the differential addresses in order, and then input to the memory address generator circuit 570.

The memory address generator circuit 570 generates "2018" obtained by adding the above six differential addresses to the absolute address "2000" input from the absolute address register 540 as the read address, and inputs the read address to the arbiter 530. The arbiter 530 inputs the above read address to the external memory 220, reads data from the address 2018 on the memory, and transfers the data to the internal memory of each PE.

Subsequently, the operation of the CP 500 according to the fourth embodiment will be described.

As in the first embodiment, in starting the data transfer, the data transfer control unit 510 conducts initialization according to a flow of FIG. 4. As the initialization of the differential address tables in Step S102, the respective differential addresses are written into the six differential address tables of the first differential address table to the sixth differential address table. Further, the data transfer control unit 510 conducts the setting of the absolute address, the setting of the address offset, the setting of the scheduled transfer column number L, the reset of the transferred column number, and the resetting of all pointer registers of the first pointer register to the sixth pointer register, as the respective initializations.

Figure 16:
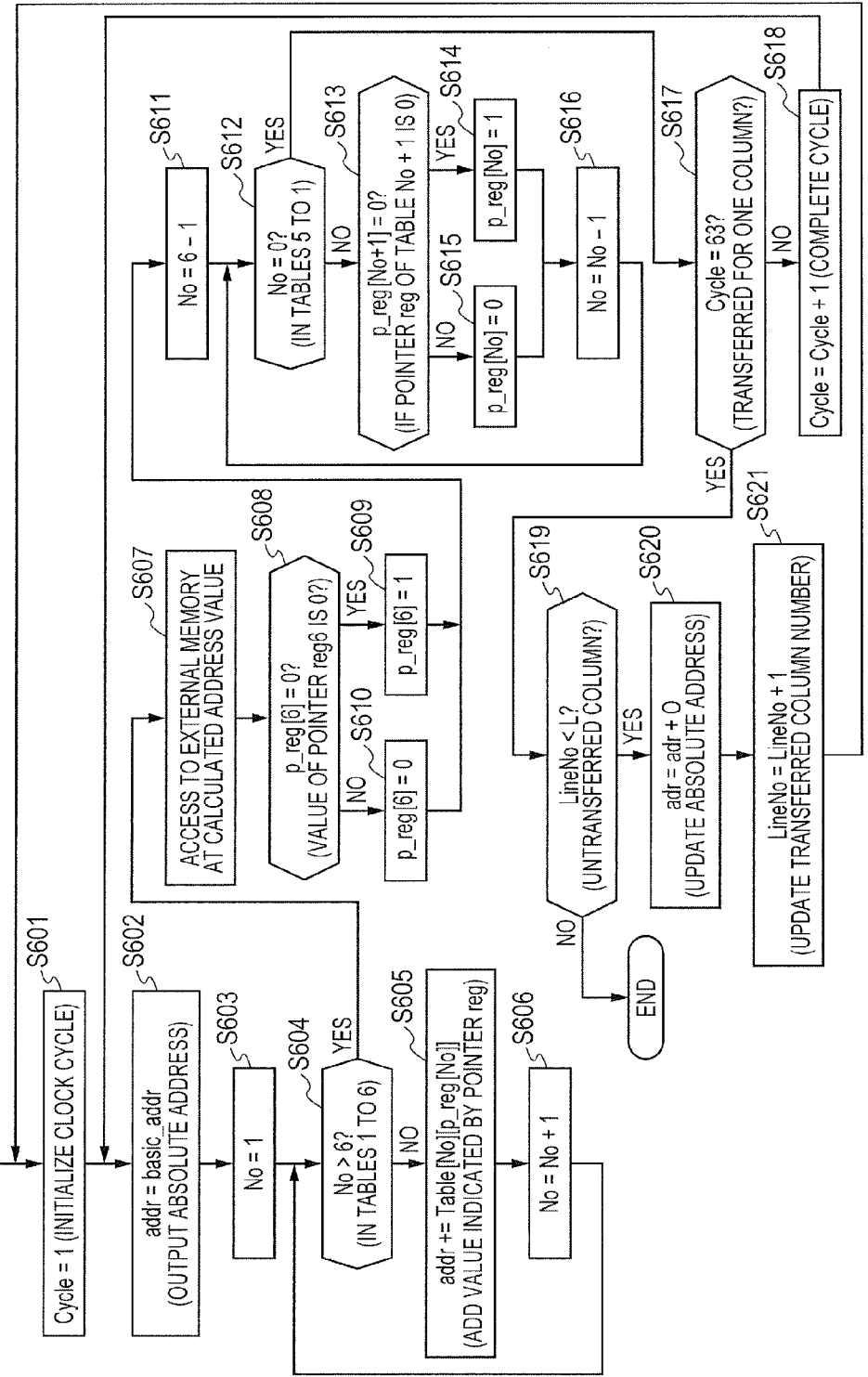
FIG. 16 is a flowchart illustrating a flow of the data transfer according to the fourth embodiment.

Subsequently, a flow of the realigning operation in the data transfer which is conducted by the DMA device according to the fourth embodiment will be described with reference to a flowchart of FIG. 16.

First, the clock cycle is initialized and set to cycle=1 (Step S601). Then, the absolute address is output to the memory address generator circuit 570 from the absolute address register 540 (Step S602). Then, No. for designating the differential addresses and the pointer registers is set to "1" (Step S603). Then, it is determined whether No.>6 is met, or not (Step S604).

In the above determination, if No.>6 is met, it is meant that there is the differential address not added. The memory address generator circuit 570 adds the value of the differential address designated by the corresponding pointer register in the differential address table of the subject No. to the absolute address already read (Step S605). Then, No. is incremented, and the operation is returned to Step S604.

In the determination of Step S604, if No.>6 is met, it is meant that the differential addresses are designated by all of the differential address tables of the first differential address table to the sixth differential address table and added one by one. Under the circumstances, the arbiter 530 inputs the addresses that have been added and generated by the memory address generator circuit 570 in the past to the external memory 220 as the read address, and conducts the data transfer (Step S607).

Then, the respective pointer registers are updated. Each of the pointer registers also functions to store the address input number to the memory. The count is 6 bits of 0 to 63, and the value of each pointer register means specific one bit of the counter. In Steps 608 to 616, the 6-bit counter is updated. The most significant bit is a value of the first pointer register 561, and the least significant bit is a value of the sixth pointer register 566.

First, it is determined whether the value of the sixth pointer register 566 is "0", or not (Step S608). If the value of the sixth pointer register 566 is "0", the value of the sixth pointer register 566 is incremented and set to "1" (Step S609). If the value of the sixth pointer register 566 is not "0", the value of the sixth pointer register 566 is set to "0" (Step S610). The same setting processing is also conducted on the first pointer register 561 to the fifth pointer register 565 (Steps S611 to S616).

If all of the pointer registers have been updated, it is determined whether a current cycle value is cycle=63, or not (Step S617). As a result of the determination, if cycle≠63 is met, the cycle value is incremented (Step S618), the operation is returned to Step S602, and the next cycle starts. On the other hand, as a result of the determination, if cycle=63 is met, because it is meant that the column transfer for one column has been completed, it is determined whether the untransferred column exists, or not (Step S619). That is, the absolute address updating circuit 610 compares the scheduled transfer column number L with the transferred column number L0. As a result of the comparison, if L0=L is met, the data transfer processing has been completed assuming that the column transfer for all of the columns has been completed, it waits for a next data transfer instruction from the data transfer control unit 510. On the other hand, As a result of the determination in Step S616, if L0<L is met, because there is an untransferred column, the absolute address updating circuit 610 updates the absolute address (Step S620). Further, the absolute address updating circuit 610 updates the transferred column number L0 in the transferred column number register 600, returns to Step S601 (Step S621), and conducts the data transfer processing on the next column.

The differential address table is divided into six pieces which is a logarithm of the number of PE (64), and the pointer registers corresponding to the respective differential address tables are provided. As a result, the storage capacitance of the differential address is reduced more than that in the third embodiment (16 entries in the third embodiment, and 12 entries in the fourth embodiment). The system of the fourth embodiment in which the differential address table is divided by the logarithmic value of the PE number minimizes the capacitance of the differential address tables in the present invention.

Fifth Embodiment

A DMA device according to a fifth embodiment has two sets of differential address tables. However, the fifth embodiment retains the differential addresses twice as large as the number of PEs, different from the above-mentioned second to fourth embodiments in which the differential addresses selected from each of the plurality of differential address tables are combined together to generate the differential addresses of the same number as the number of PEs. The differential address table used at the time of the data transfer is switched to another to realize the high processing speed. Hereinafter, the fifth embodiment of the present invention will be described with reference to the drawings. The parts described in the first to fourth embodiments will be partially omitted from description for the purpose of clarifying the present invention.

Figure 17:
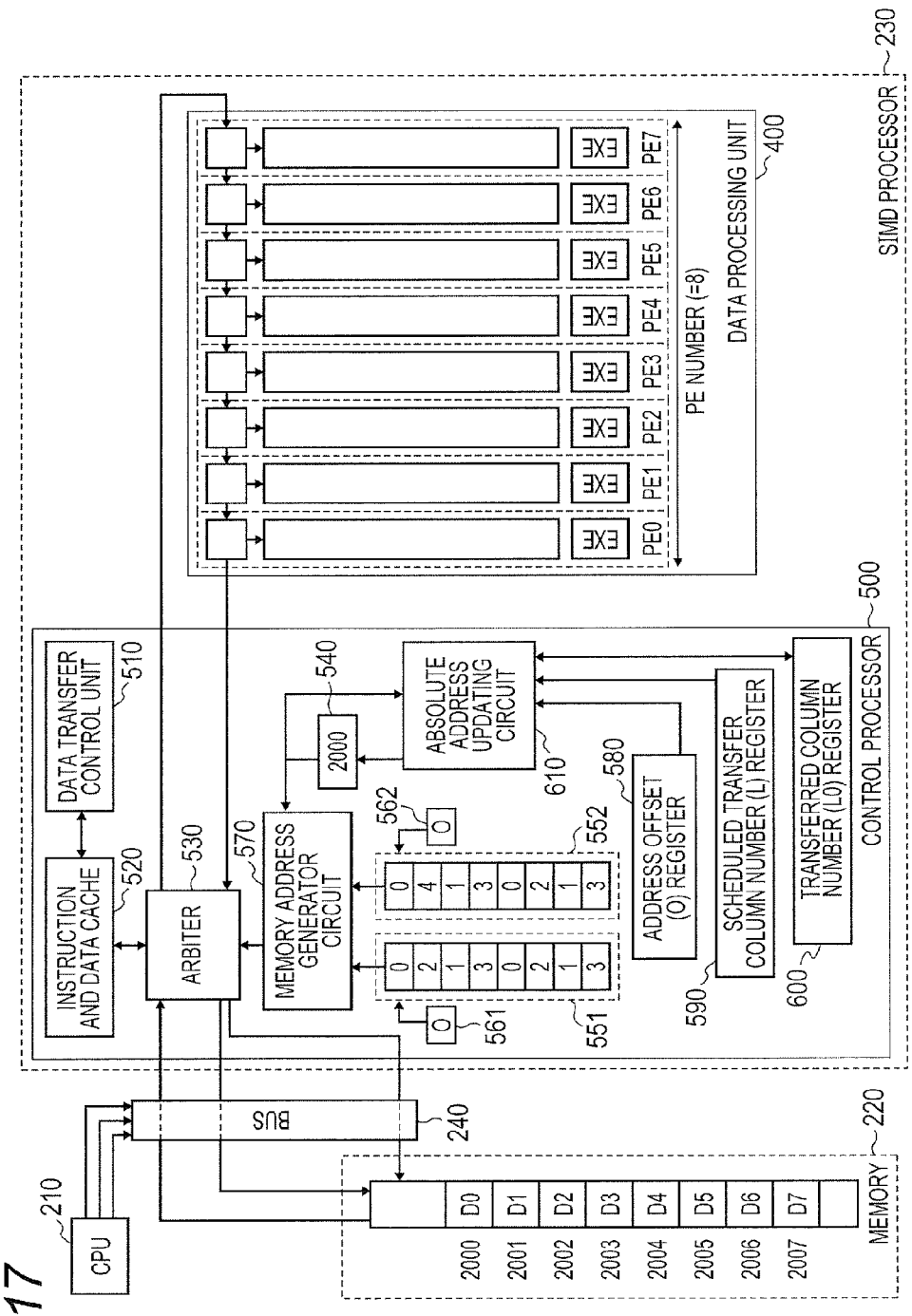
FIG. 17 is a diagram illustrating a configuration of a data processing device according to a fifth embodiment.

FIG. 17 is a block diagram illustrating a configuration of a data processing device according to the fifth embodiment. The SIMD processor 230 includes 8 processor elements. Also, the DMA device included in the SIMD processor 230 includes the first differential address register 551 and the second differential register 552. A differential address table A and a differential address table B are stored in the first differential address register 551 and the second differential register 552, respectively. Each of the differential address tables has eight entries which are the same number as the number of PEs.

Figure 18:
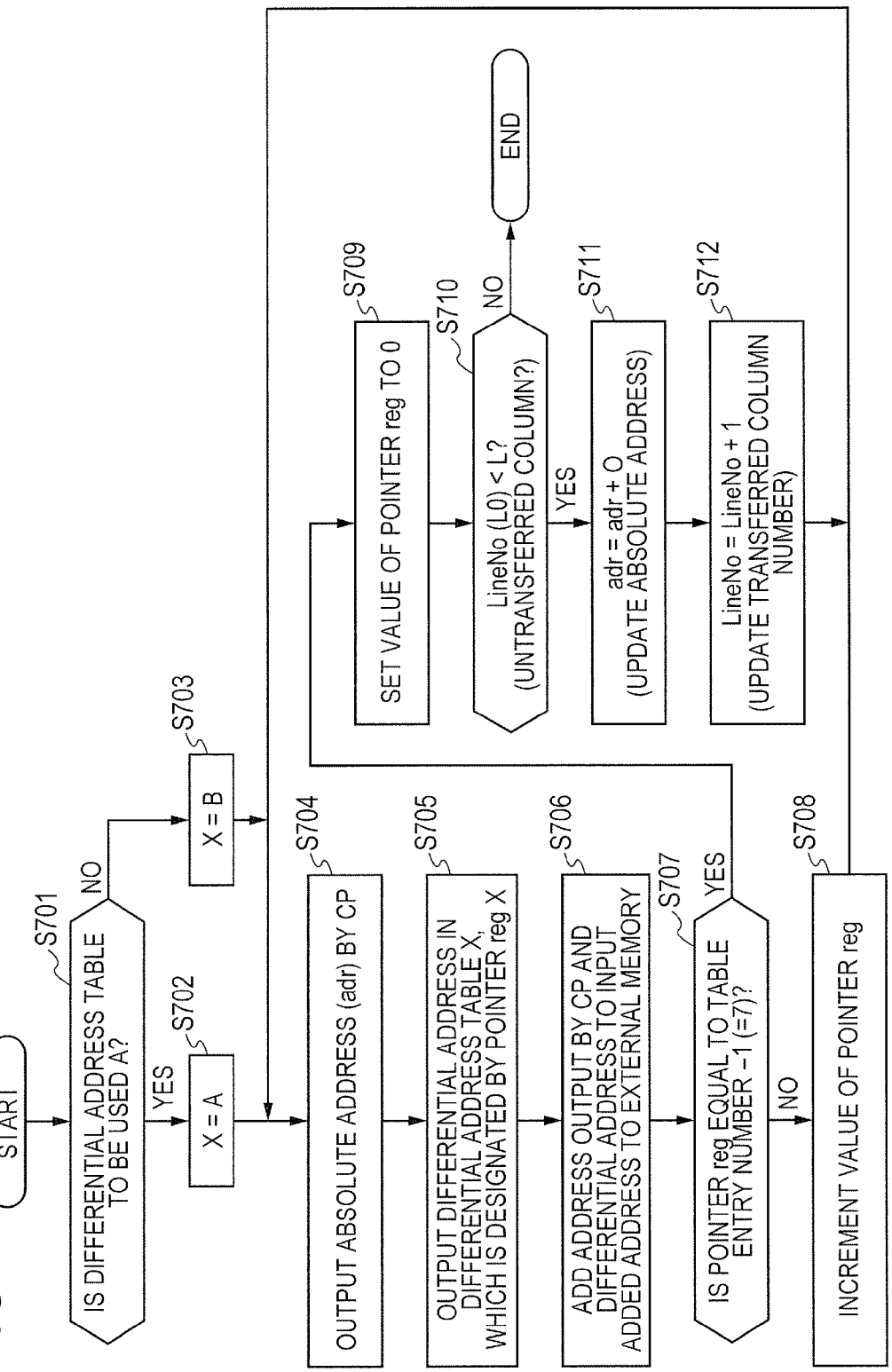
FIG. 18 is a flowchart illustrating a flow of the data transfer according to the fifth embodiment.

Subsequently, a flow of the realigning operation in the data transfer which is conducted by the DMA device according to the fifth embodiment will be described with reference to a flowchart of FIG. 18.

The data transfer control unit 510 determines which of the two differential address tables held by the DMA device is to be used, or not (Step S701). If it is determined that the differential address table A is used, a table for supplying the differential address to the memory address generator circuit 570 is set to the differential address table A (Step S702). On the other hand, if it is determined that the differential address table B is used, a table for supplying the differential address to the memory address generator circuit 570 is set to the differential address table B (Step S703).

Thereafter, the memory address is generated by using the differential address designated by the pointer register and supplied from the set differential address table. The data transfer control unit 510 conducts the switching control of the differential address table to be used at the time of initialization or changing of the processing contents. A flow of the subsequent processing is identical with that in FIG. 5, and therefore will be omitted from description.

As described above, in the DMA device according to the fifth embodiment, the differential address storage unit stores a plurality of differential address tables used for memory address generation therein. The DMA device includes a differential address table selection unit that selects any differential address table to be used from the plurality of differential address tables stored in the differential address storage unit.

According to the above configuration, two sets of differential addresses are provided to reduce a time and effort for updating of the differential address. For example, if the two kinds of differential addresses are to be alternately used, for example, every transfer, there is a need to rewrite the differential address table every completion of transfer in the first embodiment. On the contrary, in the DMA device according to the fifth embodiment, the differential address to be used can be switched to another by merely designating the differential address table used at the time of starting the transfer. Because the processing of rewriting the differential address table can be omitted, the DMA device of this embodiment is superior to the DMA device according to the first embodiment from the viewpoints of the power consumption and the processing time.

The DMA device according to the fifth embodiment holds two sets of differential address tables, but can provide three or more differential address tables. Taking the switching frequency of the processing contents required by the SIMD processor into account, it is possible to appropriately design how many sets of differential address tables can be stored. When the kind of processing required by the SIMD processor is determined in advance, if the differential address tables of the number corresponding to the number of kinds of the processing are stored in advance, the processing speed is further increased. That is, because the updating of the differential address tables becomes unnecessary, and the differential address table to be used is merely switched to another according to the switching of the processing to be executed by the SIMD processor, the processing can be shifted immediately to the next processing.

Also, the fifth embodiment can be combined with any one of the second to fourth embodiments. That is, the DMA device can store a plurality of differential address tables having the entries of the number smaller than the number of PEs, and switch the combination of the differential address tables to be used by the data transfer control unit to another.

As has been described in the respective embodiments, according to the present invention, the access position of the external memory can be designated in a desired order by the combination the beginning address of the rectangle data with the differential addresses for the respective PEs within the SIMD processor. Accordingly, because data can be transferred to the internal memories of the processor elements from the external memory in a state where the data is marshaled, data transfer processing between the internal memories before the processing is executed can be omitted, and the high processing speed can be realized.

The present invention is not limited to the above embodiments, but can be appropriately modified without departing from the subject matter. For example, the present invention can provide the following configuration.

Figure 19:
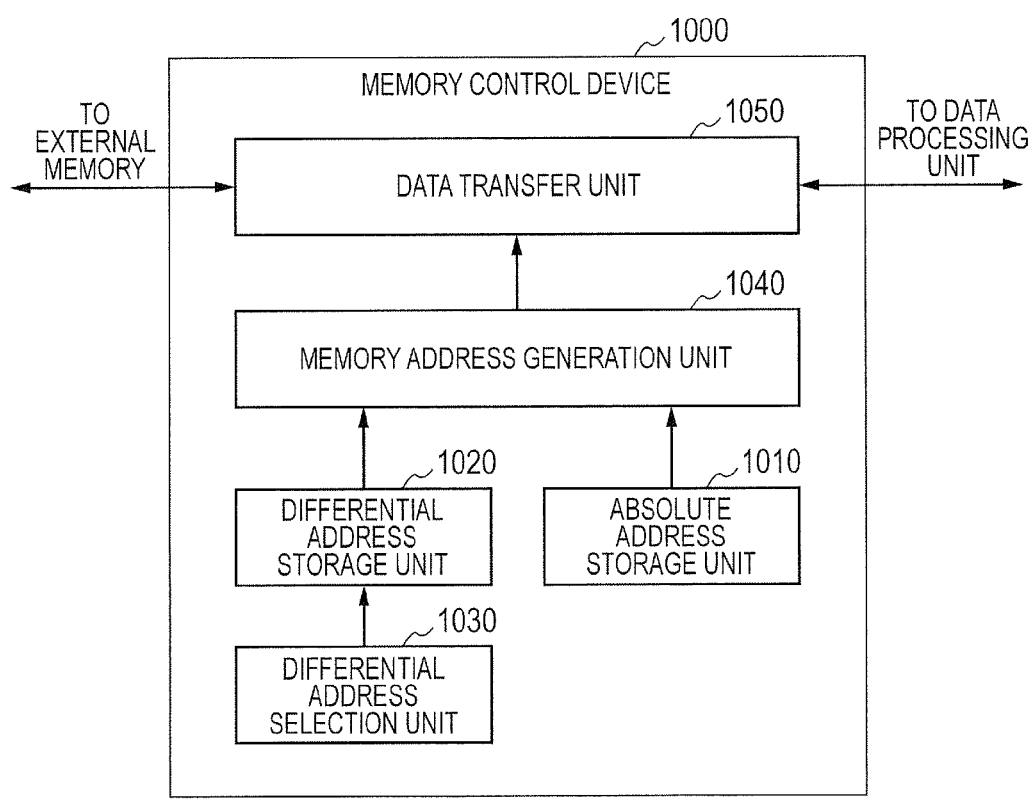
FIG. 19 is a block diagram illustrating one configuration of a memory control device according to the present invention.

FIG. 19 is a block diagram illustrating a configuration of a memory control device 1000 according to the present invention. The memory control device 1000 includes an absolute address storage unit 1010, a differential address storage unit 1020, a differential address selection unit 1030, a memory address generation unit 1040, and a data transfer unit 1050.

The absolute address storage unit 1010 stores the absolute address serving as a common reference value in a given data transfer period. In this example, the given data transfer period is a period during which the column transfer which is the data transfer for supplying data of one unit to all of the plurality of processing mechanisms PE is conducted for one column.

The differential address storage unit 1020 stores a plurality of differential addresses. The plurality of differential addresses can be stored as the differential address table in a lump. The differential address storage unit 1020 can store a plurality of differential address tables in which the plurality of differential addresses are organized therein.

The differential address selection unit 1030 selects (designates) the plurality of differential addresses stored in the differential address storage unit 1020 in a given order. Specifically, the differential address selection unit 1030 is configured by a pointer register that designates the plurality of differential addresses which is organized in the differential address table in a given order one by one. The differential address selection unit 1030 can include a plurality of pointer registers in correspondence with the number of differential addresses stored in the differential address storage unit 1020.

The memory address generation unit 1040 combines any differential address selected by the differential address selection unit 1030 with the absolute address to generate a memory address. If the differential address is stored in two systems of storage circuits, the memory address generation unit 1040 combines three kinds consisting of the single absolute address and two kinds of differential addresses to generate an address for external memory access.

The data transfer unit 1050 inputs the memory address generated by the memory address generation unit 1040 to the external memory, and reads the data from the memory address on the external memory to transfer the data.

With the above configuration, the data can be transferred to the data processing unit in a state where the data is marshaled.

Figure 20:
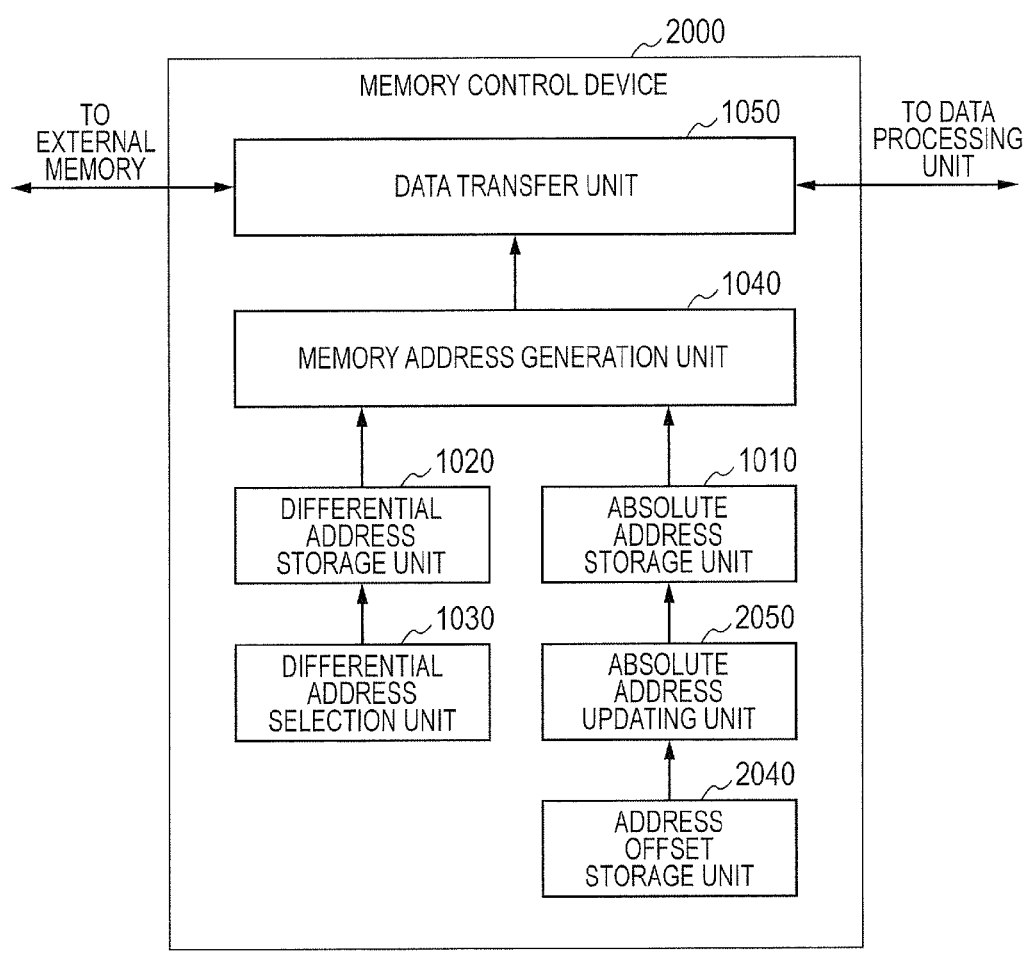
FIG. 20 is a block diagram illustrating another configuration of the memory control device according to the present invention.

Also, the memory control device according to the present invention can be configured by a memory control device 2000 illustrated in FIG. 20. The memory control device 2000 further includes an address offset storage unit 2040, and an absolute address updating unit 2050.

The address offset storage unit 2040 stores an address offset for absolute address updating therein.

The absolute address updating unit 2050 updates the absolute address stored in the absolute address storage unit 1010. More specifically, the absolute address updating unit 2050 adds the absolute address stored in the absolute address storage unit 1010 and the address offset stored in the address offset storage unit 2040 to generate a new absolute address every time the memory address generation unit 1040 generates the memory addresses of the same number as that of the processing mechanisms included in the data processing unit.

The absolute address updating unit 2050 stores the generated absolute address in the absolute address storage unit 1010 to update the absolute address.

With the above configuration, because the absolute address updating unit 2050 updates the absolute address every time the column transfer is completed, the data transfer can be sequentially continued.

Figure 21:
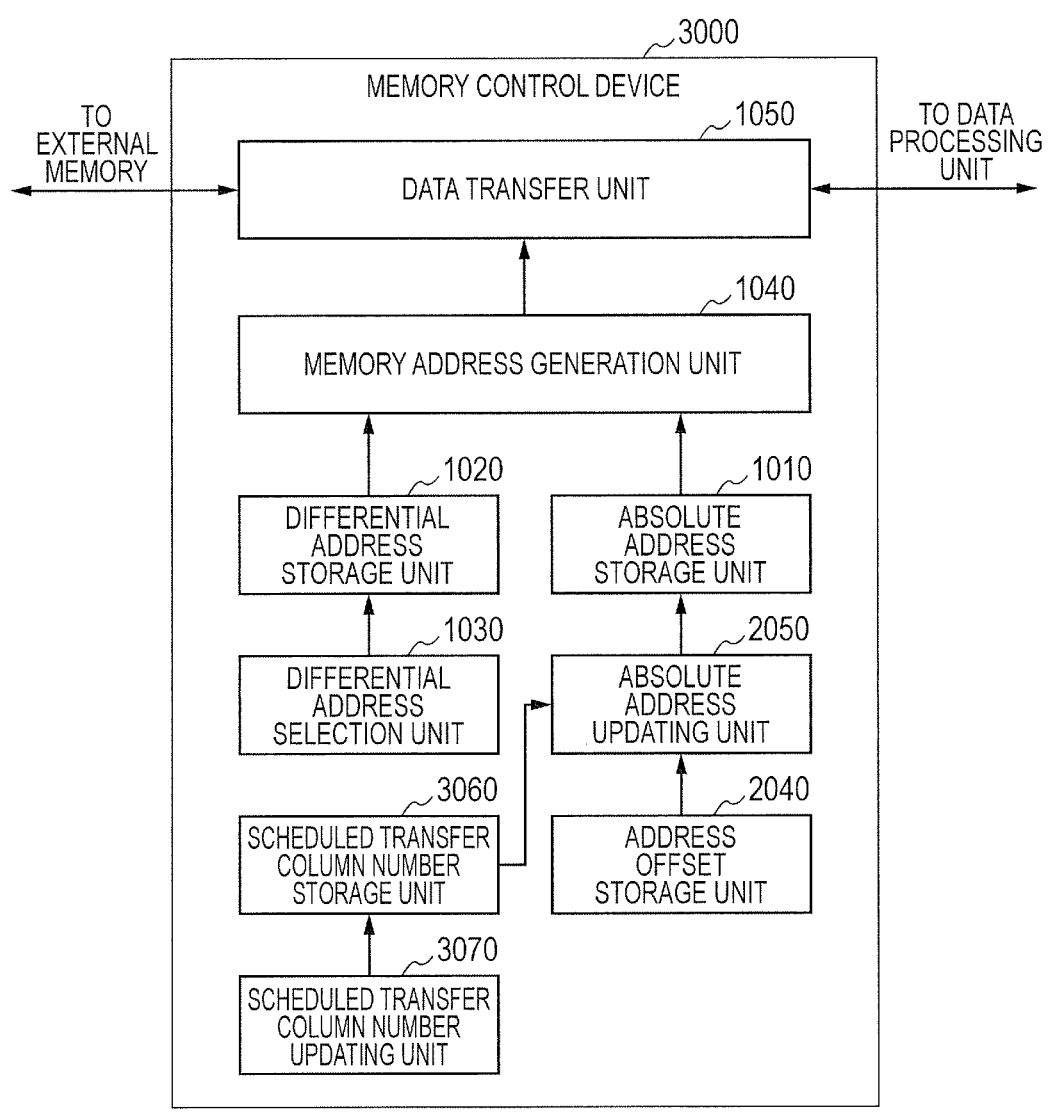
FIG. 21 is a block diagram illustrating still another configuration of the memory control device according to the present invention.

Also, the memory control device according to the present invention can be configured by a memory control device 3000 illustrated in FIG. 21. The memory control device 3000 includes a scheduled transfer column number storage unit 3060, and a scheduled transfer column number updating unit 3070.

The scheduled transfer column number storage unit 3060 stores a scheduled transfer column number which is a scheduled number of column transfer which is data transfer for supplying data of one unit to all of the plurality of processing mechanisms included in the data processing unit.

The scheduled transfer column number updating unit 3070 decrements and updates the scheduled transfer column number stored in the scheduled transfer column number storage unit 3060 every time the column transfer for one column has been completed.

The absolute address updating unit 2050 refers to the updated scheduled transfer column number stored in the scheduled transfer column number storage unit 3060 every time the column transfer for one column has been completed, and does not update the absolute address assuming that all of the column transfer has been completed if the scheduled transfer column number is 0.

Also, the memory address generation unit 1040 also completes the generation of the memory address assuming that all of the column transfer has been completed. The data transfer unit 1050 also completes the data transfer assuming that all of the column transfer has been completed.

Figure 22:
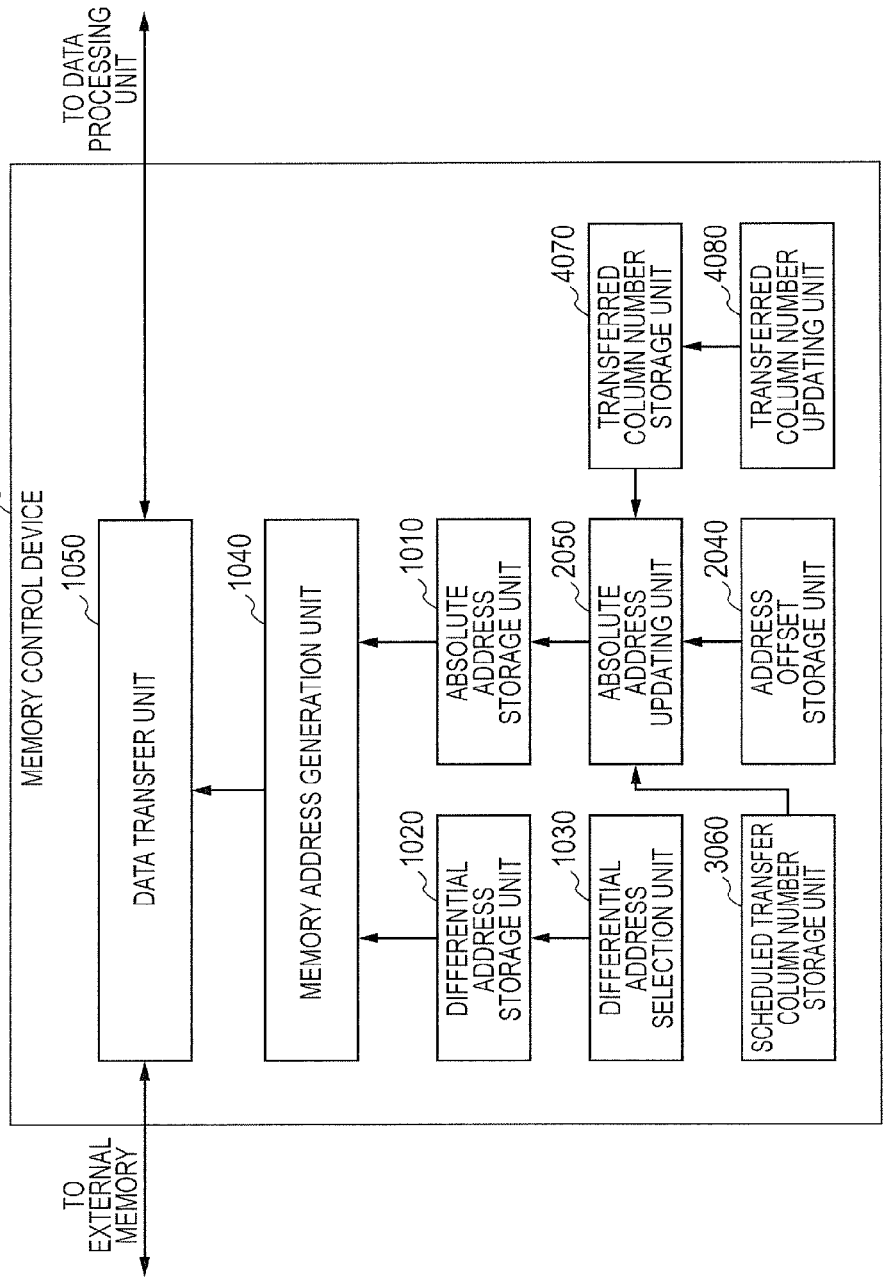
FIG. 22 is a block diagram illustrating yet still another configuration of the memory control device according to the present invention.

With the above configuration, the column transfer can be automatically conducted by the scheduled transfer column number preset by initialization. The configuration of a memory control device 4000 illustrated in FIG. 22 can also automatically conduct the column transfer by the preset scheduled transfer column number. The memory control device 4000 further includes a transferred column number storage unit 4080, and a transferred column number updating unit 4090. On the other hand, as compared with the memory control device 3000, the memory control device 4000 does not the scheduled transfer column number updating unit 3070, and the scheduled transfer column number storage unit 3060 holds the scheduled transfer column number set at the time of initialization as it is.

The transferred column number storage unit 4080 stores the transferred column number which is the number of column transfer completed hitherto.

The transferred column number updating unit 4090 increments and updates the transferred column number stored in the transferred column number storage unit 4080 every time the column transfer for one column has been completed.

The absolute address updating unit 2050 compares the scheduled transfer column number stored in the scheduled transfer column number storage unit 3060 with the transferred column number stored in the transferred column number storage unit 4080 every time the column transfer for one column has been completed. If the transferred column number is equal to the scheduled transfer column number, the absolute address updating unit 2050 does not update the absolute address. Also, the memory address generation unit 1040 also completes the generation of the memory address assuming that all of the column transfer has been completed. The data transfer unit 1050 also completes the data transfer assuming that all of the column transfer has been completed. The above configuration may be applied.

In addition, the memory control device may include various-parameter setting unit necessary for the data transfer. The parameter setting unit may set the absolute address, the differential address, the address offset, and the scheduled transfer column number in the absolute address storage unit 1010, the differential address storage unit 1020, the address offset storage unit 2040, and the scheduled transfer column number storage unit 3060, as the data transfer parameters, respectively.

Also, the present invention can provide a semiconductor integrated circuit, including a first register that stores an absolute address serving as a common reference value in a given data transfer period therein, a second register that stores a plurality of differential addresses therein, a pointer register that designates the plurality of differential addresses in a given order, a memory address generator circuit that combines any differential address selected by the pointer register with the absolute address to generate a memory address, and a data transfer circuit that inputs the memory address generated by the memory address generator circuit to a memory, and reads and transfers the data from the memory address.

Also, the present invention can provide an image processing system including a camera (image pickup device) that acquires image data, and a display (image display device) that displays the image data, in addition to the data processing device having the above memory control device. The above data processing device receives the image data from the camera to store the image data into an internal memory (data storage unit), transfers the data from the memory to the data processing unit in a state where the data is marshaled by using the above DMA device, and the data processing unit conducts given data processing, and outputs the processed image data to the display. This configuration may be applied.

Also, the above description is applied to a case in which two-dimensional data such as the image is processed. However, the present invention is not limited to this configuration, but can be applied to a variety of data processing technologies in which the data stored in the memory is marshaled and read to increase the data processing speed.

Also, in the above description, it would be understood by an ordinary skilled person that the respective elements illustrated in the drawings as the functional blocks that conduct various processing can be realized by the combination of hardware with software (program) in various fashions, and are not limited to hardware or software.

Also, the above-mentioned program is stored by the aid of various types of non-transitory computer readable medium, and can be supplied to a computer. The non-transitory computer readable medium includes various types of tangible storage medium. The non-transitory computer readable medium is exemplified by a magnetic recording medium (for example, flexible disc, magnetic tape, hard disk drive), a magnetooptical recording medium (for example, magnetooptical disc), CD-ROM (Read Only Memory), CD-R, CD-R/W, a semiconductor memory (for example, mask ROM, PROM (Programmable ROM), EPROM (Erasable PROM), a flash ROM, and RAM (Random Access Memory). Also, the program may be supplied to a computer by various types of transitory computer readable medium. The transitory computer readable medium is exemplified by an electric signal, an optical signal, and electromagnetic wave. The transitory computer readable medium can supply a program to the computer through a wired communication channel such as an electric wire or an optical fiber, or a wireless communication channel.

What is claimed is:

1. A memory control device that transfers data from an external memory to a data processing unit having a plurality of processing mechanisms, the memory control device comprising:
    an absolute address storage unit that stores an absolute address serving as a common reference value in a given data transfer period;
    a differential address storage unit that stores a plurality of differential addresses therein, each of the differential addresses indicating a difference between a read address and the absolute address;
    a differential address selection unit that selects any one of the plurality of differential addresses in a given order;
    a memory address generation unit that combines any differential address selected by the differential address selection unit with the absolute address to generate a memory address; and
    a data transfer unit that inputs the memory address generated by the memory address generation unit to the external memory, reads the data from the memory address, and transfers the data to the data processing unit.

2. The memory control device according to claim 1, further comprising:
    an absolute updating unit that updates the absolute address, wherein the absolute address storage unit stores the absolute address updated by the absolute address updating unit therein.

3. The memory control device according to claim 2, wherein the absolute address updating unit updates the absolute address every time the memory address generation unit generates a number of memory addresses equal to a number of the processing mechanisms in the plurality of the processing mechanisms, and wherein the differential address selection unit again selects the plurality of differential addresses in the given order every time the memory address generation unit generates the number of memory addresses equal to the number of the processing mechanisms.

4. The memory control device according to claim 2, further comprising:
an address offset storage unit that stores an address offset for absolute address updating,
wherein the absolute address updating unit combines the absolute address stored in the absolute address storage unit with the address offset to update the absolute address.

5. The memory control device according to claim 4, further comprising:
a parameter setting unit that conducts initialization for allowing the absolute address, the plurality of differential addresses, and the address offset to be stored in the absolute address storage unit, the differential address storage unit, and the address offset storage unit.

6. The memory control device according to claim 2, further comprising:
a scheduled transfer column number storage unit that stores a number of columns scheduled for transfer;
a transferred column number storage unit that stores a number of transferred columns; and
a transferred column number updating unit that increments and updates the number of transferred columns stored in the transferred column number storage unit every time a transfer of one column is completed,
wherein the data transfer unit continues data transfer until the number of columns scheduled for transfer have been transferred.

7. The memory control device according to claim 2, further comprising:
a scheduled transfer column number storage unit that stores a number of columns scheduled for transfer; and
a scheduled transfer column number updating unit that decrements and updates the number of columns scheduled for transfer stored in the scheduled transfer column number storage unit every time a transfer of one column is completed,
wherein the data transfer unit continues data transfer until the number of columns scheduled for transfer becomes 0.

8. The memory control device according to claim 1,
wherein the differential address storage unit stores a plurality of differential address tables in which a plurality of differential addresses are organized therein,
wherein the differential address selection unit includes a plurality of pointer registers that select each of the plurality of differential addresses organized in the plurality of differential address tables in a given order, and
wherein the memory address generation unit combines the plurality of differential addresses selected by the plurality of pointer registers with the absolute address to generate the memory address.

9. The memory control device according to claim 8,
wherein the differential address storage unit stores a first differential address table in which the plurality of differential addresses are organized, and a second differential address table in which the plurality of differential addresses are organized therein,
wherein the differential address selection unit includes a first pointer register that selects any one of the plurality of differential addresses organized in the first differential address table in the given order, and a second pointer register that selects any one of the plurality of differential addresses organized in the second differential address table in the given order, and
wherein the memory address generation unit combines any differential address selected by the first pointer register, any differential address selected by the second pointer register, and the absolute address together to generate the memory address.

10. The memory control device according to claim 1, further comprising:
a differential address table selection unit that selects any differential address table used for memory address generation from a plurality of differential address tables stored in the differential address storage unit,
wherein the memory address generation unit combines the differential address selected by a pointer register in the given order from the plurality of differential addresses included in the differential address table selected by the differential address table section unit, with the absolute address to generate the memory address.

11. A memory control method that transfers data from an external memory to a data processing unit having a plurality of processing mechanisms, the memory control method comprising:
storing an absolute address serving as a common reference value in a given data transfer period;
storing a plurality of differential addresses, each of the differential addresses indicating a difference between a read address and the absolute address;
selecting any one of the plurality of differential addresses in a given order;
combining the selected differential address with the absolute address to generate a memory address; and
inputting the generated memory address to the external memory, reading the data from the memory address, and transferring the data to the data processing unit.

12. A data processing device, comprising:
a data processing unit having a plurality of processing mechanisms connected in series, each having at least an internal memory and an arithmetic circuit;
a control unit that controls the data processing unit;
an absolute address storage unit that stores an absolute address serving as a common reference value in a given data transfer period;
a differential address storage unit that stores a plurality of differential addresses therein, each of the differential addresses indicating a difference between a read address and the absolute address;
a differential address selection unit that selects any one of the plurality of differential addresses in a given order;
a memory address generation unit that combines any differential address selected by the differential address selection unit with the absolute address to generate a memory address; and
a data transfer unit that inputs the memory address generated by the memory address generation unit, reads the data from the memory address, and transfers the data to the data processing unit.

13. An image processing system, comprising:
an external memory that temporarily stores data therein;
an image pickup device that picks up an image and stores the image in the external memory;

the data processing device according to claim 12, which reads image data temporarily stored in the external memory to conduct given data processing; and an image display device that displays the image data that has been subjected to the given data processing by the data processing device.

14. A semiconductor integrated circuit, comprising:

a first register that stores an absolute address serving as a common reference value in a given data transfer period therein;

a second register that stores a plurality of differential addresses therein, each of the differential addresses indicating a difference between a read address and the absolute address;

a pointer register that designates the plurality of differential addresses in a given order;

a memory address generator circuit that combines any differential address selected by the pointer register with the absolute address to generate a memory address; and a data transfer circuit that inputs the memory address generated by the memory address generator circuit to a memory, and reads and transfers data from the memory address.

* * * * *